(12) United States Patent
Sundström

(10) Patent No.: US 7,995,975 B2
(45) Date of Patent: Aug. 9, 2011

(54) METHOD AND APPARATUS FOR SIGNAL PEAK-TO-AVERAGE RATIO REDUCTION

(75) Inventor: Lars Sundström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1109 days.

(21) Appl. No.: 11/614,596

(22) Filed: Dec. 21, 2006

(65) Prior Publication Data

US 2008/0150625 A1 Jun. 26, 2008

(51) Int. Cl.
    *H01Q 11/12* (2006.01)
(52) U.S. Cl. .................. 455/116; 455/210; 455/308
(58) Field of Classification Search .................. 455/210, 455/308
    See application file for complete search history.

(56) References Cited

U.S. PATENT DOCUMENTS

| | | | |
|---|---|---|---|
| 3,684,968 A * | 8/1972 | Carroll | 327/361 |
| 4,748,642 A * | 5/1988 | Bertsche | 375/340 |
| 4,968,967 A * | 11/1990 | Stove | 342/165 |
| 4,982,428 A * | 1/1991 | Agazzi et al. | 379/406.08 |
| 5,295,162 A * | 3/1994 | Zarembowitch | 375/329 |
| 6,928,121 B2 | 8/2005 | Shearer, III et al. | |
| 6,931,053 B2 | 8/2005 | McGowan | |
| 6,999,522 B2 | 2/2006 | Shearer, III | |
| 2002/0042253 A1 | 4/2002 | Dartois | |
| 2002/0101935 A1 | 8/2002 | Wright et al. | |
| 2002/0101936 A1 | 8/2002 | Wright et al. | |
| 2002/0197970 A1 | 12/2002 | Jian et al. | |
| 2003/0043895 A1 | 3/2003 | Melsa | |
| 2004/0052314 A1 | 3/2004 | Copeland | |
| 2004/0076247 A1 | 4/2004 | Barak et al. | |
| 2004/0234006 A1 | 11/2004 | Leung | |
| 2004/0264595 A1 | 12/2004 | Kim | |
| 2005/0008094 A1 | 1/2005 | Kramer et al. | |
| 2005/0179498 A1 * | 8/2005 | Tsutsui et al. | 330/285 |
| 2005/0281360 A1 | 12/2005 | Booth et al. | |
| 2006/0154622 A1 | 7/2006 | Piirainen | |

FOREIGN PATENT DOCUMENTS

EP 1081851 3/2001

(Continued)

OTHER PUBLICATIONS

Nilsson, Anders et al. "Processor Friendly Peak-to-Average Reduction in Multi-Carrier Systems." Proceedings of the Swedish System-on-Chip Conference (SSoCC), Bastad, Sweden, Mar. 2004.

Farnese, Domenico. "Techniques for Peak Power Reduction in OFDM Systems." Masters Thesis, Chalmers University of Technology, Sweden 2004.

Nikopour, Hosein et al. "Effects of Cartesian Clipping Noise on the Performance of Orthogonal Frequency Division Multiplexing System: A Theoretical Approach." IEEE Global Telecommunications Conference, Nov. 2002, vol. 2, pp. 1254-1258.

(Continued)

*Primary Examiner* — Lana N Le
*Assistant Examiner* — Hsin-Chun Liao
(74) *Attorney, Agent, or Firm* — Coats & Bennett, P.L.L.C.

(57) ABSTRACT

A method and apparatus taught herein reduce the peak-to-average ratio (PAR) of a complex-valued signal based on detecting peaks in the signal that are above a peak threshold, characterizing the detected peaks in Cartesian coordinates, generating cancellation pulses in Cartesian coordinates based on the detected peak characterizations. PAR reduction processing continues with canceling the detected peaks by combining the cancellation pulses with a correspondingly delayed version of the signal. Advantageously, peak detection may be performed in polar form using a computationally efficient peak detection algorithm that avoids calculation of the I and Q peak waveforms unless a signal peak beyond a defined threshold is present. In one or more embodiments, the generation and use of asymmetric and/or shaped cancellation pulses offers further performance advantages.

21 Claims, 16 Drawing Sheets

FOREIGN PATENT DOCUMENTS

| | | |
|---|---|---|
| EP | 1195962 | 4/2002 |
| EP | 1396970 | 3/2004 |
| EP | 1458159 | 9/2004 |
| EP | 1469649 | 10/2004 |
| EP | 1273106 | 12/2005 |
| WO | 00/54428 | 9/2000 |
| WO | 2005/096580 | 10/2005 |

OTHER PUBLICATIONS

Nikopour, Hosein et al. "On the Performance of OFDM Systems Over a Cartesian Clipping Channel: A Theoretical Approach." IEEE Transactions on Wireless Communications, Nov. 2004, vol. 3, No. 6, pp. 2083-2096.

\* cited by examiner

METHOD AND APPARATUS FOR SIGNAL PEAK-TO-AVERAGE RATIO REDUCTION

BACKGROUND

1. Technical Field

The present invention generally relates to signal processing, and particularly relates to reducing the peak-to-average ratio (PAR) of complex-valued signals, such as communication signals for transmission in a wireless communication network.

2. Background

Standards for many communication techniques like cellular, Wireless Local Area Network (WLAN), digital TV broadcast, Asymmetric Digital Subscriber Line (ADSL) etc. use signal modulation techniques based on both amplitude and phase modulation. In comparison to pure phase (or frequency) modulation, amplitude-modulated signals require linear amplification for accurate signal reproduction. Nonlinearity in the amplification of such signals introduces significant problems, such as increased adjacent channel interference (ACI) and increases of error-vector-magnitude (EVM) for the signal.

Linear amplification presents challenges, particularly in the cost and power limited environments typical in wireless communication applications. For example, accommodating larger signal amplitude variations in a linear transmitter generally causes reduced power efficiency and/or higher circuit cost and complexity. Unfortunately, the current trend is to use modulation schemes that exhibit very large amplitude variations. For example, the introduction of HSDPA (High Speed Downlink Packet Access) and HSUPA (High Speed Uplink Packet Access) within the 3GPP standard will significantly increase transmit signal amplitude variations. Additionally, many standards for WLAN, digital TV broadcast, ADSL, etc., are based on Orthogonal Frequency Division Multiplex (OFDM) modulation techniques that are known to have a very large amplitude variation.

One obvious but unsophisticated technique to reduce the amplitude variation is to clip signal peaks to a certain level but this comes at the cost of potentially dramatically increased ACI and EVM. As one alternative in the OFDM signal context, it has been proposed to reduce amplitude variation by directly altering the mapping of the data onto the sub-carriers, such that the overall amplitude variation is lowered. This proposal, however, imposes restrictions on the OFDM signal itself, e.g., by allocating a large fraction of the sub-carriers for reducing amplitude variations, or by introducing a specific coding scheme.

Other approaches adopt some form of peak cancellation, as opposed to brute-force clipping. However, heretofore such approaches have entailed undesirable signal processing complexity, or have provided insufficient PAR reduction performance.

SUMMARY

Signal modulation schemes that exhibit large amplitude variations present transmitter design challenges. Reducing such variations offers simplified amplifier design and potentially lowers operating power, but risks increasing interference and signal errors. To that end, a method and apparatus taught herein implement signal peak-to-average ratio reduction that is both computationally efficient and spectrally well behaved.

In one embodiment, a method of reducing a peak-to-average ratio in a complex-valued signal comprises detecting peaks in the signal that are above a peak threshold, characterizing the detected peaks in Cartesian coordinates, and generating cancellation pulses in Cartesian coordinates based on the detected peak characterizations. The method continues with canceling the detected peaks by combining the cancellation pulses with a correspondingly delayed version of the signal.

Correspondingly, one embodiment of a signal processing circuit for reducing a peak-to-average ratio in a complex-valued signal comprises one or more processing circuits configured to detect peaks in the signal that are above a peak threshold, characterize the detected peaks in Cartesian coordinates, and generate cancellation pulses in Cartesian coordinates based on the detected peak characterizations. The signal processing circuit is configured to cancel the detected peaks by combining the cancellation pulses with a correspondingly delayed version of the signal.

For computational efficiency, at least one embodiment of peak reduction as taught herein defers peak characterization computations until a signal peak is detected. Moreover, the method of detecting such peaks offers further computational efficiency. For example, in at least one embodiment, detecting peaks in the signal that are above a peak threshold comprises evaluating the signal at a first peak detection precision, and, for peaks detected at the first peak detection precision, evaluating the signal at a greater second peak detection precision to confirm the presence of peaks detected at the first peak detection precision. Further, in response to detecting signal peaks, at least one embodiment advantageously characterizes the detected peaks in Cartesian coordinates by calculating signal peak waveforms for Cartesian components of the signal as a product of the (complex-valued) signal and a non-linear function based on the peak threshold and a sum of squared Cartesian components of the signal. The non-linear term is well behaved and is therefore readily calculable using one of a polynomial representation, or a look-up table representation.

However signal peaks are characterized, one or more embodiments of peak-to-average ratio reduction as taught herein generate peak cancellation pulses based on the characterization of the detected peaks. For example, the Cartesian components of detected signal peaks are characterized according to one or more of the following: peak shape (which may be expressed as a peak shape factor), peak height, peak width, and peak asymmetry. Cancellation of detected peaks thus may comprise selecting a closest-matching normalized pulse from a defined set of normalized pulses for each Cartesian component of the detected peak. These normalized pulses may be scaled as needed for peak height/width.

Whether generated from normalized pulses or not, the cancellation pulses may be configured for over-cancellation, e.g., cancellation pulse width or height may be made greater than detected peak width or height. Further, whether over-cancellation is used, the cancellation pulses may be asymmetrical, which offers calculation and signal timing/delay advantages.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 19 is a waveform diagram illustrating an example detected peak and a corresponding cancellation pulse, while

DETAILED DESCRIPTION

Figure 1:
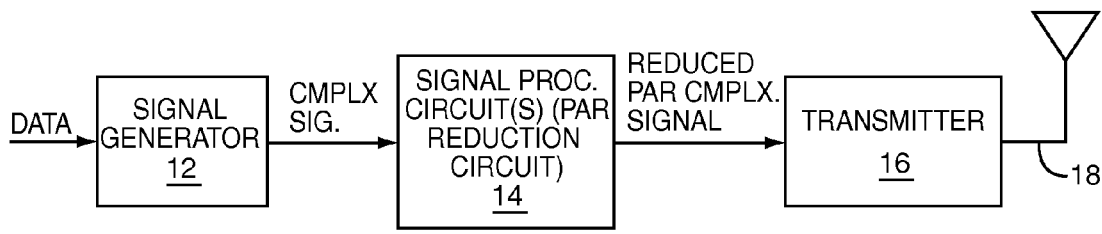
FIG. 1 is a block diagram of one embodiment of a wireless communication device that includes a signal processing circuit for carrying out one or more embodiments of PAR reduction as taught herein.

FIG. 1 illustrates a wireless communication device 10, such as a base station in a wireless communication network, or a mobile station for use in a wireless communication network. The illustrated wireless communication device 10 comprises a signal generator 12, a signal processing circuit (or circuits) 14, a transmitter 16 and an associated antenna 18. In operation, the signal generator 12 generates a complex-valued signal, such as by mapping input data to phase and amplitude points in a defined modulation constellation. In turn, the signal processing circuit 14 processes the complex-valued signal (simply referred to as the "signal") to reduce its amplitude variations, while simultaneously limiting increases in the signal in adjacent channel interference (ACI) and error vector magnitude (EVM). Peak-to-average ratio (PAR) reduction by the signal processing circuit 14 relieves the linear amplification requirements of the transmitter 16, while simultaneously avoiding the spectral splatter and signal errors that might otherwise arise from "peak clipping" or other brute-force PAR reduction techniques.

Figure 2:
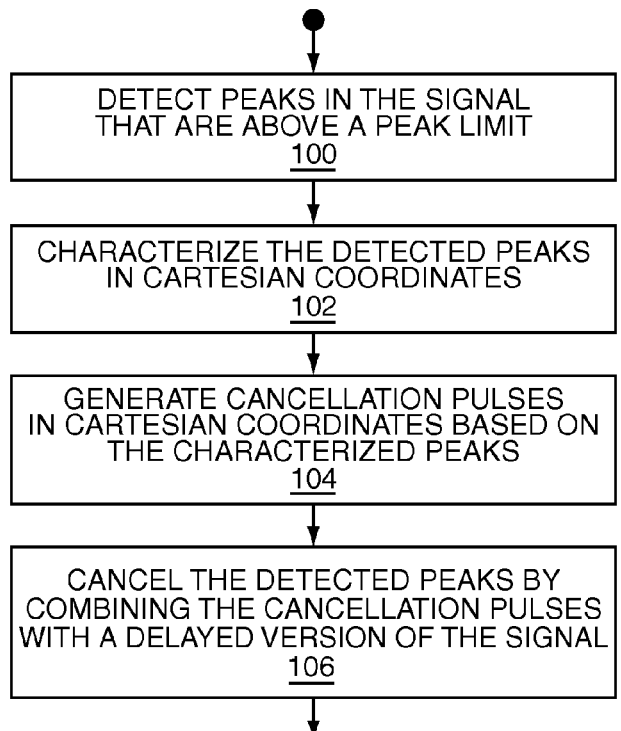
FIG. 2 is a logic flow diagram of one embodiment of PAR reduction processing.

FIG. 2 presents one embodiment of processing logic that can be implemented in the signal processing circuit 14, and it should be understood that the illustrated method can be implemented in hardware, software or firmware, or any combination thereof. With that in mind, PAR reduction processing "begins" with detecting peaks in the signal that are above a peak threshold (Step 100). The peak threshold may be predetermined and held by the signal processing circuit 14 as a stored value, or may be dynamically determined (or at least dynamically adjusted). Moreover, different peak thresholds may be used for different modulation standards and/or operating modes.

Processing continues with characterization of the detected peaks in Cartesian coordinates (Step 102). At least one embodiment characterizing the detected peaks in Cartesian coordinates comprises characterizing the in-phase (I) and quadrature (Q) components of each detected signal peak. Processing continues with generation of cancellation pulses in Cartesian coordinates based on the characterized peaks (Step 104), and "finishes" with cancellation of the detected peaks by combining the cancellation pulses with a delayed version of the signal (Step 106). That is, a cancellation pulse is generated for each detected peak in the signal, and a corresponding cancellation pulse is added to the signal in time-alignment with peak to be cancelled. Note that the terms "cancel," "cancelled," and "cancellation" as used herein do not necessarily connote perfect or complete peak cancellation and, in at least some contexts, merely denote substantial peak reduction, which is deemed cancellation.

Generating the cancellation pulses in Cartesian coordinates comprises, for each cancellation pulse, generating a cancellation pulse to cancel the I peak component and generating a cancellation pulse to cancel the Q peak component. In other words, a cancellation pulse is generated for each Cartesian component of a detected peak in the complex-valued signal for which PAR reduction is desired. Cartesian coordinate based generation of the cancellation pulses allows the signal processing circuit 14 to tailor the cancellation pulse to the particular peak characteristics of the I and Q signal components, which generally will not be the same.

Thus, in at least one embodiment, the method comprises characterizing the detected peaks in Cartesian coordinates, generating cancellation pulses in Cartesian coordinates based on the detected peak characterizations, and canceling the detected peaks by combining the cancellation pulses with a correspondingly delayed version of the signal. In this method, characterizing the detected peaks may comprise characterizing an I-component and a Q-component of each detected peak in the signal (for which PAR reduction is desired). Correspondingly, generating cancellation pulses may comprise generating an I-component cancellation pulse for each detected peak in the signal based on the characterization of the I-component of the detected peak, and generating a Q-component cancellation pulse for each detected peak in the signal based on the characterization of the Q-component of the detected peak. Further, canceling the detected peaks may comprise combining the I-component cancellation pulse with a time-aligned I-component of the signal, and combining the Q-component cancellation pulse with a time-aligned Q-component of the signal.

Additionally, in at least one embodiment, characterizing the detected peaks in Cartesian coordinates comprises calculating a shape factor for I and Q components of each detected peak. Complementing that characterization, generating cancellation pulses in Cartesian coordinates based on the detected peak characterizations comprises comparing the shape factors for the I and Q components of each detected peak to shape factors of corresponding normalized cancellation pulses and scaling the amplitudes of the corresponding normalized cancellation pulses based on the comparisons.

Figure 3:
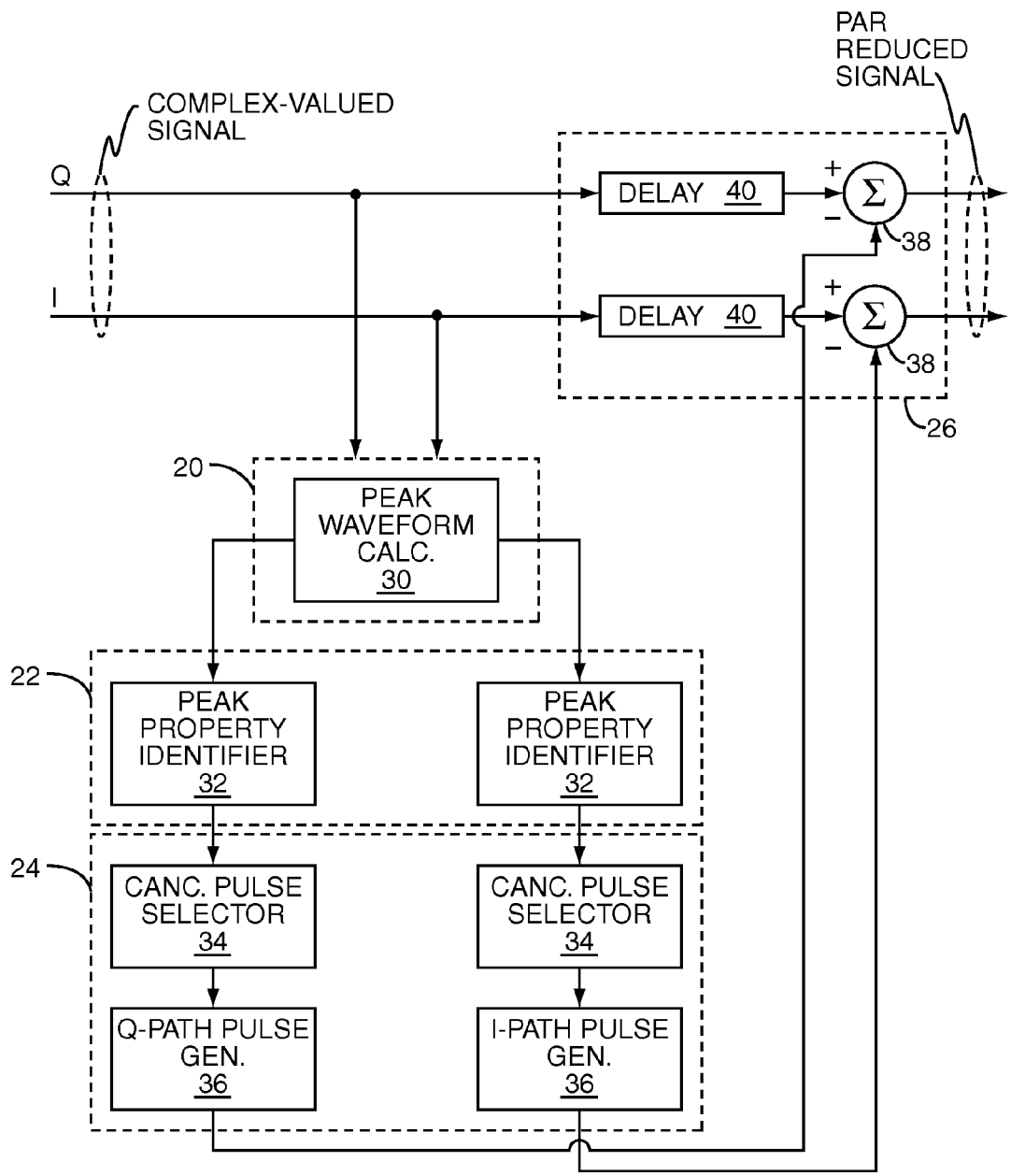
FIG. 3 is a block diagram of one embodiment of a functional circuit arrangement for supporting PAR reduction processing by the signal processing circuit introduced in FIG. 1.

FIG. 3 presents one functional circuit embodiment of the signal processing circuit 14, for carrying out the above-detailed PAR reduction method, or variations of it. The illustrated signal processing circuit 14 comprises a peak detector circuit 20 configured to detect those peaks in the signal that are above the peak threshold, a peak characterization circuit 22 to characterize the detected peaks in Cartesian coordinates, and a pulse generation circuit 24 to generate cancellation pulses in Cartesian coordinates based on the detected peak characterizations. The illustrated signal processing circuit 14 further comprises a cancellation circuit 26 to cancel the detected peaks by combining the cancellation pulses with a correspondingly delayed version of the signal.

In addition to functional circuitry for detecting peaks, such as by detecting peaks in in polar form, the peak detector circuit 20 includes a peak waveform calculator 30. For detected peaks, the peak waveform calculator 30 computes signal peak waveforms for the I and Q components of the signal. In turn, the peak characterization circuit 22 includes a peak property identifier 32 for the I peak component and the Q peak component. With that configuration, the peak characterization circuit 22 characterizes the I and Q components of each detected peak, and provides corresponding characterization information to the pulse generation circuit 24.

The pulse generation circuit 24 includes a cancellation pulse selector 34 and an x-path pulse generator 36, where "x" connotes I for the in-phase (real) path and connotes "Q" for the quadrature (imaginary) path. The pulse generation circuit 24 generates cancellation pulses in Cartesian coordinates (I cancellation pulse and Q cancellation pulse pairs) and, as noted, the cancellation circuit 26 combines these cancellation pulses with a correspondingly delayed version of the signal to reduce signal peaks and therefore reduce the PAR of the signal. A signal summing circuit 38 and a delay element 40 for the I-path of the signal and another signal summing circuit 38 and a delay element 40 for the Q-path of the signal support such operation. (The delay value of the delay elements 40 is set to the value needed to properly time align the Cartesian components of the cancellation pulses generated by the cancellation pulse generator circuits 36 with the corresponding Cartesian components of the signal.)

With the above broad understanding of the signal processing circuit 14 in mind, a more detailed discussion of its operation in one or more embodiments begins with an understanding of the complex-valued signal for which PAR reduction is desired. At baseband, a signal to be transmitted can be represented by two waveforms $I_i$ and $Q_i$ that combined define a complex baseband signal given as, $$s_i = I_i + jQ_i \quad \text{Eq. (1)}$$

That is, the baseband signal can be represented by an I-component signal and a Q-component signal. Of course, the signal also can be represented by its polar components (the amplitude $r_i$ and the phase $\phi_i$). In polar form, the signal is given as, $$s_i = r_i \cdot e^{j\phi_i} \quad \text{Eq. (2)}$$

In characterizing the signal, one may calculate the root-mean-squared (RMS) and the PAR values for the signal. The RMS value is calculated as, $$\text{RMS} = \sqrt{\frac{1}{T_i}\int_0^{T_i}|s_i|^2\,dt} = \sqrt{\frac{1}{T_i}\int_0^{T_i}r_i^2\,dt} \quad \text{Eq. (3)}$$

where $T_i$ defines the time interval over which the RMS value is calculated. The peak amplitude may be defined by $r_{max} = \max(r_i)$. Based on these values, one may define true peak-to-average-ratio (TPAR) as, $$TPAR = \left(\frac{r_{max}}{\text{RMS}}\right)^2 \quad \text{Eq. (4)}$$

In many cases, however, these definitions are not practical because theoretically $r_{max}$ approaches infinity, in which case the PAR value becomes infinite. Instead, the $r_{max}$ quantity is commonly defined based on a certain percentile of the amplitude probability density function $\rho(r)$ of the signal.

For example, if one considers the 99.9 percentile, one obtains, $$0.999 = \int_0^{r_{max999}} \rho(r)\,dr \quad \text{Eq. (5)}$$

From Eq. (5), one may calculate $r_{max999}$. Correspondingly, one may calculate the PAR value as, $$PAR = \left(\frac{r_{max999}}{\text{RMS}}\right)^2 \quad \text{Eq. (6)}$$

Note that PAR in the above expression is defined in linear power but may equally well be specified in dB if desired. Regardless, as an example, one may consider an OFDM signal with a large number of independent sub-carriers, e.g., one-hundred or more. For that type of signal, the amplitude probability density function approximates a Rayleigh distribution and, from this, one finds a PAR value of approximately 8.4 dB.

Turning to a more detailed example, one embodiment of PAR reduction as implemented by the signal processing circuit 14 operates on a complex-valued input signal $s_i = I_i + jQ_i = r_i \cdot e^{j\phi_i}$, which is a time-limited waveform specified in the digital domain as a number of time-discrete samples. Here, peaks are defined as complex-valued pulses or parts of the complex-valued waveform with the amplitude $r_i$, larger than a peak threshold level $r_{peak,th}$.

Figure 4:
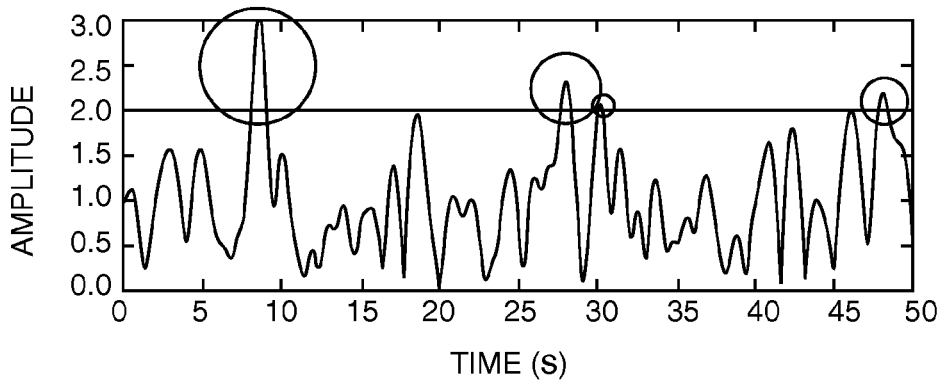
FIGS. 4 and 5 are waveform diagrams of an example waveform and its corresponding signal peaks, relative to a given peak threshold.

In FIG. 4, one sees a peak threshold level of "2" for the depicted amplitude scale. With that threshold as the peak detection reference, one sees the presence of four peaks in the illustrated portion of the signal. Based on this, one may define the peak amplitude waveform—i.e., the portions of the signal waveform that are above the defined peak detection threshold, as, $$r_{peak} \begin{cases} 0 & r_i \leq r_{peak,th} \\ r_i - r_{peak,th} & r_i > r_{peak,th} \end{cases} \quad \text{Eq. (7)}$$

The complex-valued peak waveform is obtained by reintroducing the argument (the phase) of the input signal, thereby yielding an expression for the peak signal waveform as, $$s_{peak} = r_{peak} e^{i\phi_i} \quad \text{Eq. (8)}$$

Figure 5:
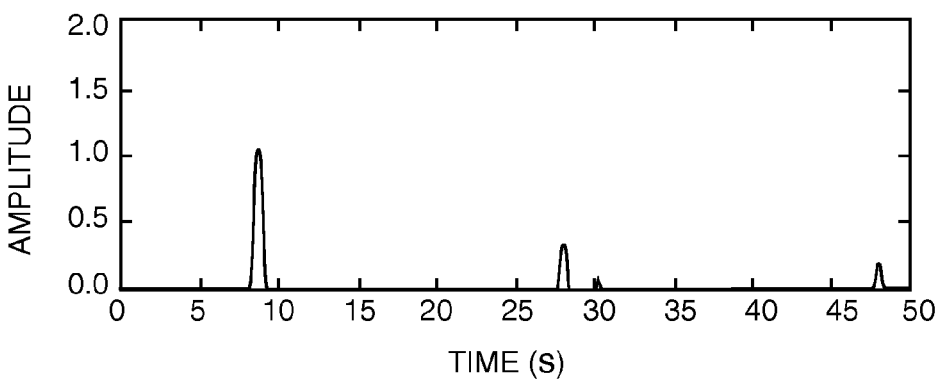

FIG. 5 illustrates the peak amplitude waveform $r_{peak}$ corresponding to the signal peaks identified in FIG. 4.

The peak waveform depicted in FIG. 5 is obtained from the complex-valued input signal in polar form. However, for peak cancellation, it is helpful to work with the Cartesian representation of the peak waveform, which is given as, $$s_{peak} = I_{peak} + jQ_{peak} \quad \text{Eq. (9)}$$

The Cartesian components of the peak waveform of Eq. (9) are represented in FIGS. 6 and 7, depicting the I peak waveform components (I path) and the Q peak waveform components (Q path) of the detected peaks from the complex-valued signal representation first illustrated in FIG. 4.

Figure 6:
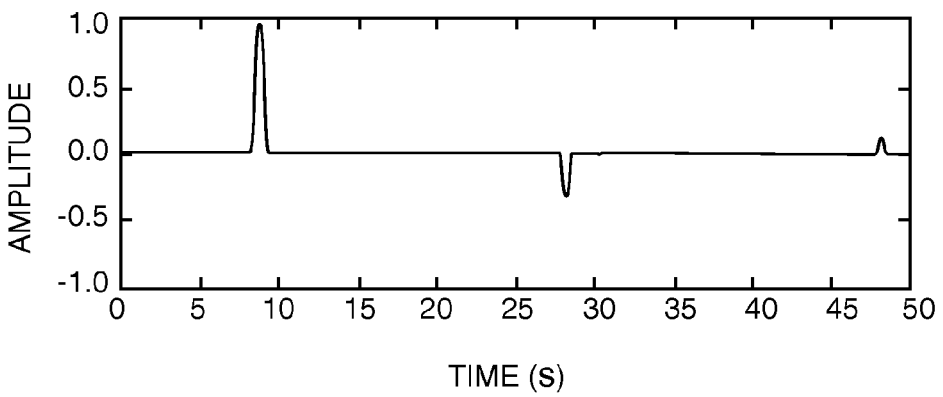
FIGS. 6 and 7 are waveform diagrams of the Cartesian components (I and Q waveforms) of the peak waveform shown in FIG. 5.
Figure 7:
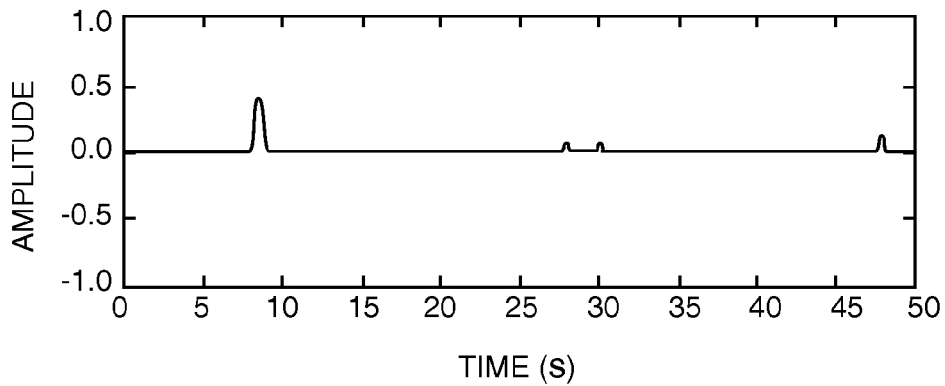

One immediately appreciates from the Cartesian representation of the peak waveform given by FIGS. 6 and 7 that the I and Q peak waveform components of any given detected peak generally are not the same, thus favoring a cancellation approach that operates in the Cartesian coordinate domain. In at least one embodiment, PAR reduction thus comprises detecting peaks in a complex-valued signal, e.g., an OFDM or other modulated communication signal to be transmitted, generating peak value waveforms for each Cartesian component of each detected peak. Then, for each peak waveform, cancellation comprises selecting or generating a best-matching cancellation pulse for the I/Q components of the detected peak, and then combining the I/Q cancellation pulses with the I and Q components of the detected peak in time-aligned fashion. In this manner, the I/Q components of the cancellation pulses time-align with and cancel the I/Q components of the detected peaks in the signal.

Thus, the signal waveform for which PAR reduction is desired should be evaluated, such as on a symbol-time basis, or by monitoring signal sample stream values in real-time or near real-time, to detect signal peaks relative to the peak threshold. Peak waveforms are then generated for the I and Q components of each detected peak, and best-matching cancellation pulses are then generated based on characterizing the peak waveforms. The cancellation pulses are then combined in time-aligned fashion with the original signal to reduce its PAR. The detected peaks may be characterized based on determining their beginning and ending points (in time) their amplitude (magnitude and sign), and/or their shape or other parameters. Peak cancellation also may consider the degree of asymmetry in the detected peaks, such that matching cancellation pulses to the detected peaks further involves matching to at least some extent the detected peak asymmetry.

Figure 8:
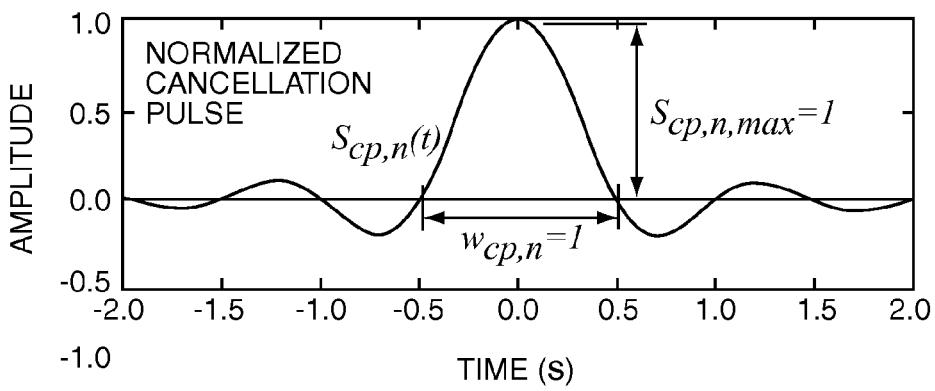
FIGS. 8 and 9 are waveform diagrams of an example normalized peak cancellation pulse and a corresponding example detected peak waveform.
Figure 9:
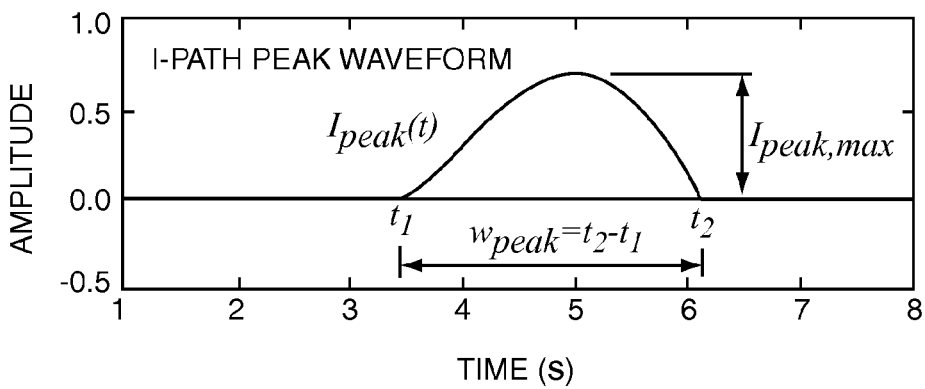

FIG. 9 depicts an arbitrary single peak from one of the Cartesian components of a peak waveform, while FIG. 8 depicts a corresponding normalized cancellation pulse. Note that the width of the normalized cancellation pulse does not necessarily need to coincide with the width of the peak waveform between (or determined by) zero crossings, as shown in this example. Moreover, a closest-matching normalized cancellation pulse can be selected from a defined set of normalized pulses, and then "fitted" to the particulars of the peak waveform based on scaling the height, width, and/or shape of the normalized pulse.

More generally, the cancellation pulse properties must be such that they effectively cancel the detected peaks. In at least one embodiment, the signal processing circuit 14 generates cancellation pulses that match the detected peaks in terms of not only magnitude and width, but also qualitatively match with respect to other shape characteristics. As such, the cancellation pulse characteristics may differ for different detected peaks, and may have generally different characteristic properties for different types of modulation and for different peak threshold levels.

However, it is advantageous for the cancellation pulses to exhibit spectral properties that comply with any applicable frequency-domain performance standards, e.g., many if not most communication protocols have established frequency-domain envelopes that define maximum allowed spectral splatter. As such, the cancellation pulses should not add "noise" to the signal, such that the PAR reduced signal violates any such frequency-domain constraint. (The technique assumes that the sequence of peaks can be considered as a random sequence of pulses such that the total power spectral density introduced by cancellation pulses is the sum of the individual pulse power spectral densities.)

One method of defining an appropriate set of cancellation pulses, which may be stored in a memory circuit associated with the signal processing circuit 14, is to start with a predefined pulse-shape whose magnitude and width can be adjusted with respect to each peak to be cancelled. The magnitude and width quantities can either be continuous or discrete and, optionally, may be defined for a limited range (min, max). Different types of cancellation pulses may be used. Indeed, the signal processing circuit 14 may use a different family or base type of cancellation pulse for each different modulation scheme used to generate the signal for which PAR reduction is desired.

Sinc-function pulses offer good spectral efficiency, and thus would appear to be a good basis for cancellation pulse generation. However, without aggressive truncation, which causes spectral splatter problems, sinc-function pulses are quite wide in the time domain and are disadvantageous in this regard. (The disadvantage of a wide pulse with significant leading and trailing ripple is that the cancellation pulse "covers" a large number of samples in the signal being processed and requires significant delay/buffering processing, so that the large number of values needed to represent the cancellation pulse can be combined with the correspondingly large number of affected signal samples. This fact also highlights the disadvantage that wide cancellation pulses involve a correspondingly large number of combining operations, wherein the number of signal samples covered by the cancellation pulse is quite large.)

Figure 10:
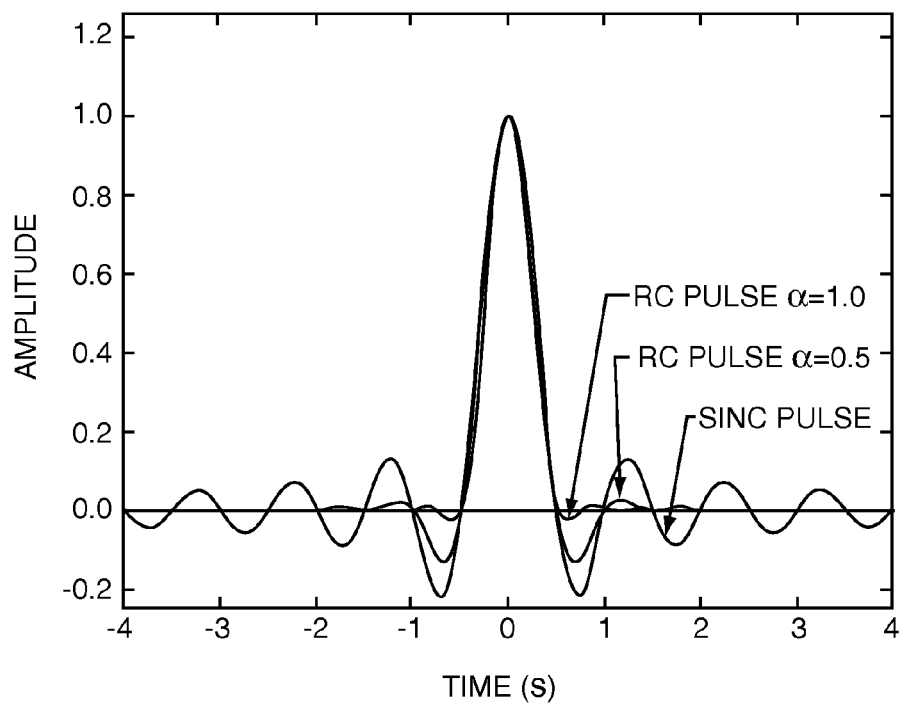
FIG. 10 is a waveform diagram of raised cosine (RC) cancellation pulses having different roll-off factors, in comparison with a sinc-function pulse.

Raised-cosine (RC) or square-root raised cosine (SQRC) pulses represent an attractive alternative to sinc-function pulses, given the ability to maintain good spectral performance with shorter cancellation pulse widths—set by a roll-off factor $\alpha$. That is, RC and SQRC pulses approximate sinc-function pulses, but approach zero faster and thus permit more aggressive truncation without overly significant spectral splatter. Further, the signal processing circuit 14 can be configured to use windowing functions, e.g. the Kasier function, to improve the spectral properties of the (truncated) cancellation pulses. FIG. 10 provides a comparative illustration of sinc-function versus RC pulses with different roll-off factors α, which are all normalized to have a width of 1 in time units. Note that SQRC pulse types also may be used.

One point readily identifiable from the waveform illustrations in FIG. 10 is that cancellation pulses based on sinc-functions, or on RC/SQRC approximations, exhibit pulse symmetry wherein the main lobe (pulse peak) is centered between leading and trailing "ringing" portions of the actual cancellation pulse peak. As alluded to earlier, these ringing portions of the cancellation pulse must be combined with the corresponding signal samples, resulting in a large number of calculations and requiring significant time delays (and/or buffering requirements) for proper alignment of the affected signal samples with the sample values comprising the overall cancellation pulse.

Thus, while the RC and SQRC filters have good spectral properties, their disadvantages are the necessity of introducing a large delay/latency in the PAR reduction processing implemented by the processing circuit 14. In some cases, such as in the transmission of high-rate data within a wireless communication network, such latency may not be acceptable. To that end, at least one embodiment of PAR reduction taught herein uses asymmetric cancellation pulses, wherein the main lobe is located at the beginning of the cancellation pulse waveform, thereby minimizing the required signal delay/latency required for time aligning the cancellation pulse to the signal for which PAR reduction is desired. For example, the signal processing circuit 14 may be configured to implement a Butterworth filter function (or a Chebyshev, Bessel, Cauer etc. filter function) and calculate cancellation pulses as the corresponding filter impulse response. Classically, this type of filter exhibits an impulse response having an initial main lobe, followed by decaying ringing.

Figure 11:
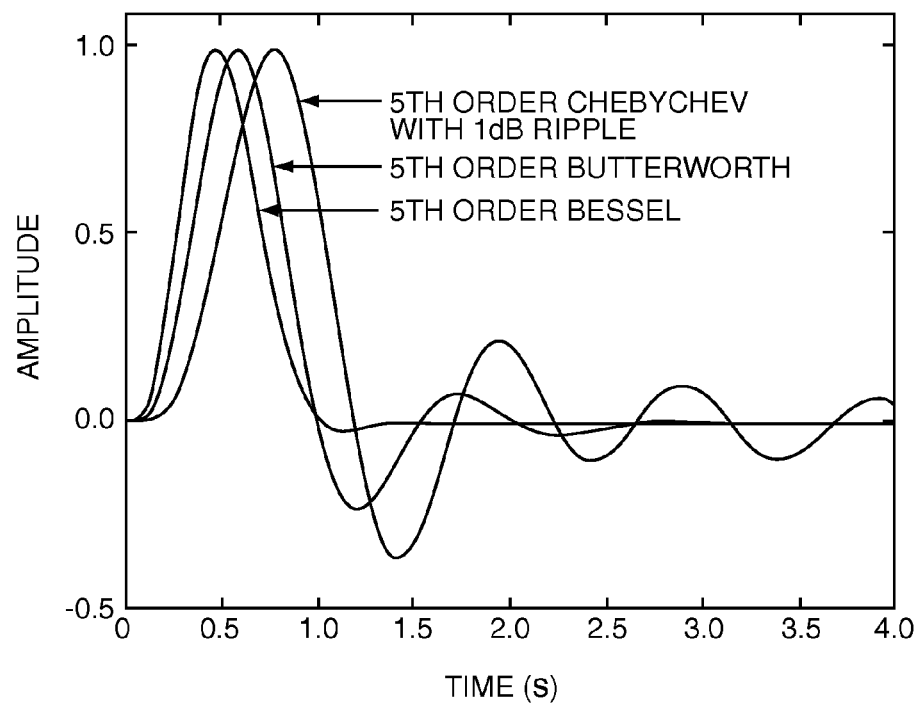
FIG. 11 is a waveform diagram of asymmetric cancellation pulses generated according to a number of different filter types.

The order of the filter function should be high enough to approximate the spectral properties of the RC/SQRC pulses that would be used, absent their latency disadvantages. FIG. 11 illustrates example filter impulse responses for different types of filter implementations. Of course, these examples are non-limiting and the particular type of filter chosen and its order may be set based on the needs of the particular PAR reduction application.

Figure 12:
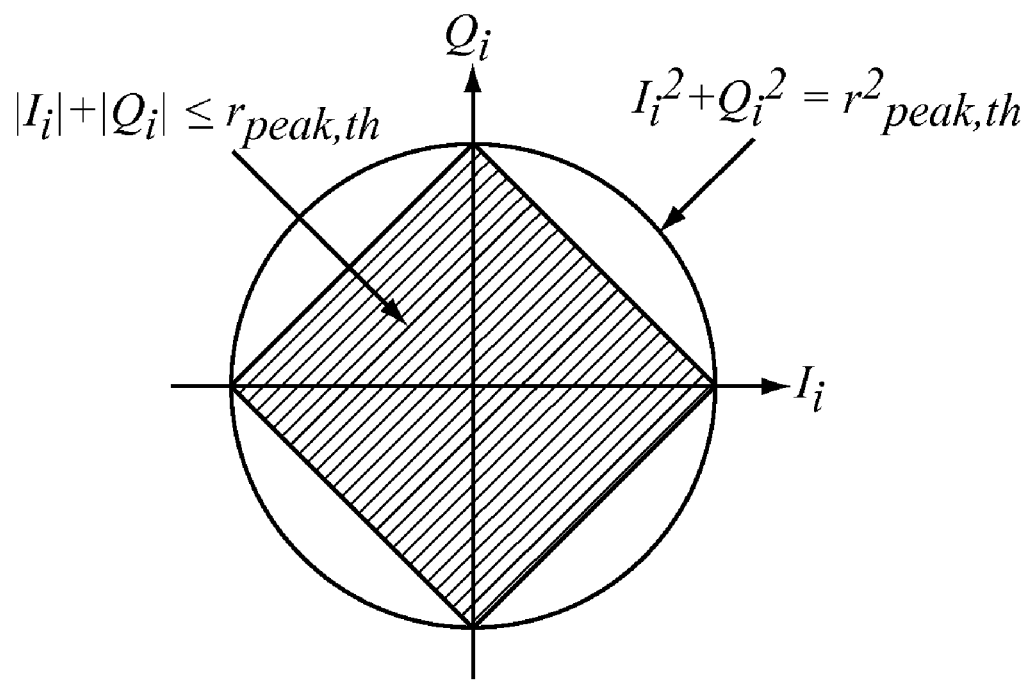
FIG. 12 is a graph of mathematical boundaries associated with first and second levels of peak detection reliability (precision), associated with one embodiment of detecting signal peaks in polar form.

With all of the above supporting details in mind, FIG. 12 illustrates a basis for significantly improving the processing efficiency of PAR reduction in one or more embodiments taught herein. In essence, the basic PAR reduction method taught herein detect peaks in the signal for which PAR reduction is desired, and then calculates the I and Q peak waveforms of each detected peak, which allows characterization and subsequent cancellation of each detected peak. However, the peak waveform calculations need be carried out only if a peak in the signal actually exceeds the defined peak threshold.

With that point in mind, the circle plotted on I/Q axes represents the peak threshold magnitude squared, $r_{peak,th}^2$, while the perimeter of the hatched diamond area within the circle represents the peak threshold magnitude, $r_{peak,th}$. This signal graph illustrates an advantageous peak detection method, wherein the signal processing circuit 14 foregoes peak waveform calculations until it actually detects a peak in the signal that is above the defined peak threshold, and, moreover, implements a computationally efficient method of detecting such peaks.

In at least one embodiment, detecting peaks in the signal that are above a peak threshold comprises evaluating the signal at a first peak detection precision and, for peaks detected at the first peak detection precision, evaluating the signal at a greater second peak detection precision to confirm the presence of peaks detected at the first peak detection precision. As used herein, the "precision" of peak detection does not necessarily connote the underlying mathematical precision of the computations being carried out, but rather denotes the reliability of the peak detection operation.

Thus, peaks may be detected at a first reliability using a relatively simple equation. Peaks detected at that first reliability may then be "confirmed" by evaluating the signal at those detected peaks using a second, greater reliability of peak detection. Such an approach provides a computationally efficient algorithm that implements a polar form of peak detection, wherein possible peaks are identified using a first calculation, and then confirmed using a second calculation that identifies the presence of actual signal peaks. In other words, the peak detector circuit 20 is, in one or more embodiments, configured with peak detection circuitry, which may be hardware, software, or any combination thereof, that performs pre-screening peak detection, wherein it carries out a computationally simple screening function that identifies the possible presence of signal peaks. For possible peaks identified in this prescreening, the peak detector circuit 20 then performs additional calculations that determine whether the possible peaks actually are peaks that meet or exceed the defined peak threshold. Put simply the first peak detection function tells the signal processing circuit 14 that a signal peak may be present, while the second peak detection function confirms (or refutes) the presence of such peaks.

The above peak detection method may operate in polar form, wherein the peak threshold is in polar form (i.e., $r_{peak,th}$). With that representation, evaluating the signal at the first peak detection precision comprises comparing a sum of absolute (unsigned) values of the Cartesian components of the signal to the peak threshold (e.g., is $|I_i|+|Q_i| \leq r_{peak,th}$?), and evaluating the signal at the second peak detection precision comprises comparing a sum of the squared values of the Cartesian components of the signal to the squared peak threshold (e.g., is $I_i^2+Q_i^2 \leq r_{peak,th}^2$?).

Figure 13:
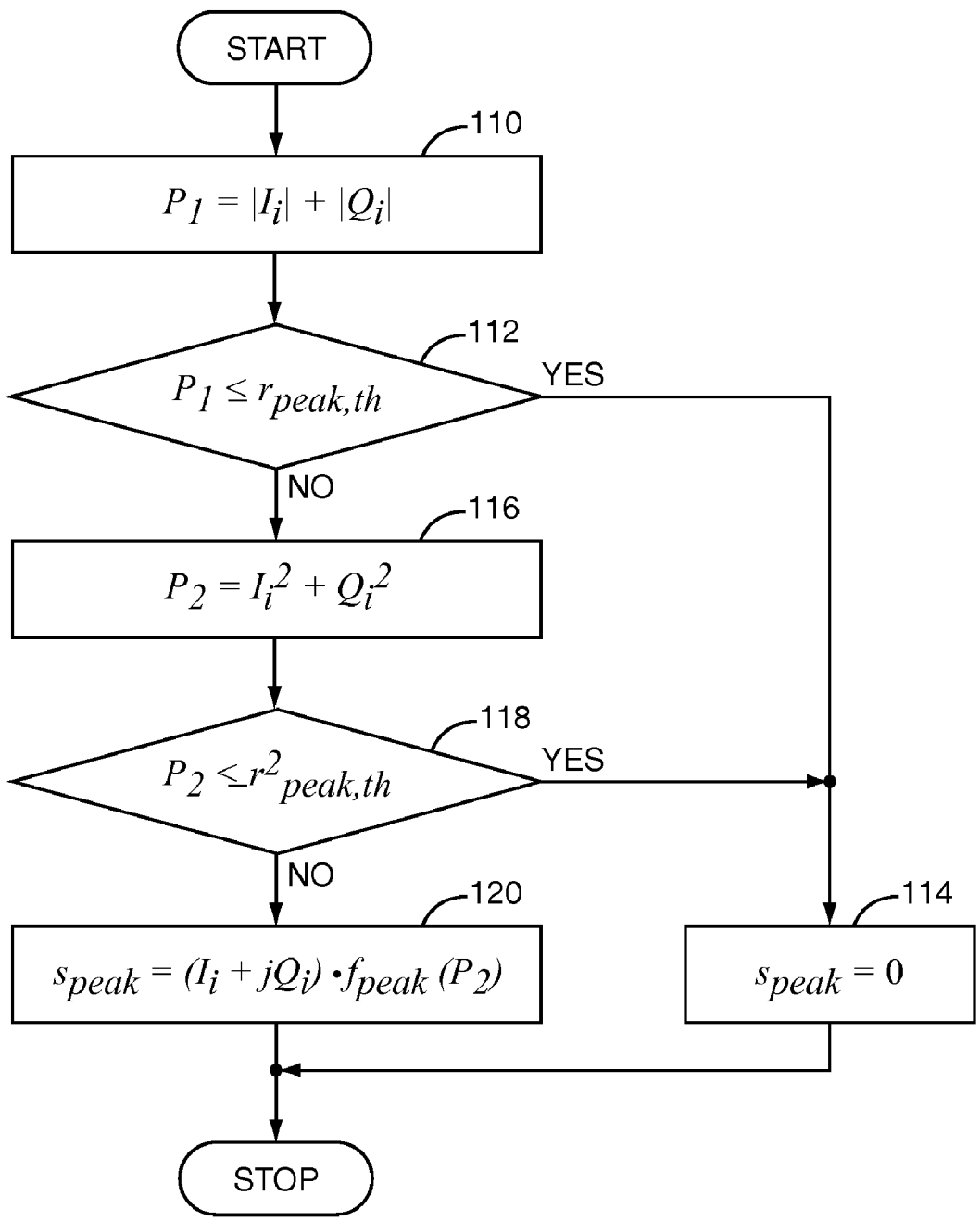
FIG. 13 is a logic flow diagram of signal peak detection in polar form, and corresponds to the mathematical boundaries illustrated in FIG. 12.

FIG. 13 illustrates processing logic that may be implemented within the signal processing circuit 14, for carrying out the above computationally efficient peak detection method. With $P_1=|I_i|+|Q_i|$, peak detection processing "begins" with the signal processing circuit calculating $P_1$ for the Cartesian components of the given signal sample(s) of interest (Step 110), and comparing $P_1$ to $r_{peak,th}$ (Step 112). If $P_1$ is less than or equal to $r_{peak,th}$, then peak reduction processing is not needed, i.e., the signal does not exceed the defined peak threshold, and the peak waveform needed for peak characterization therefore is set to zero ($s_{peak}=0$ and needless calculations are thereby avoided (Step 114).

If, however, the signal sample value(s) exceed the peak detection threshold, processing continues with what amounts to a peak detection confirmation, wherein the signal processing circuit 14 confirms that the peak detected based on the first comparison ($P_1 \leq r_{peak,th}$) exceeds the peak magnitude squared threshold. Thus, the signal processing circuit 14 computes $P_2=I_i^2+Q_i^2$ (Step 116), and assesses whether $P_2$ is below the peak magnitude squared threshold (Step 118) (i.e., it evaluates $P_2 \leq r_{peak,th}^2$?). If $P_2$ is not lower than the squared threshold, then there is a signal peak and peak waveform calculations must be carried out. If $P_2$ is less than the squared threshold, peak waveform calculation is not necessary, and $s_{peak}$ is set to zero (Step 114).

For detected peaks and corresponding peak waveform calculations, processing continues with computation of the peak waveform for the detected peak according to the following equation (Step 120), $$s_{peak}=(I_i+jQ_i) \cdot f_{peak}(P_2) \qquad \text{Eq. (10)}$$

Figure 14:
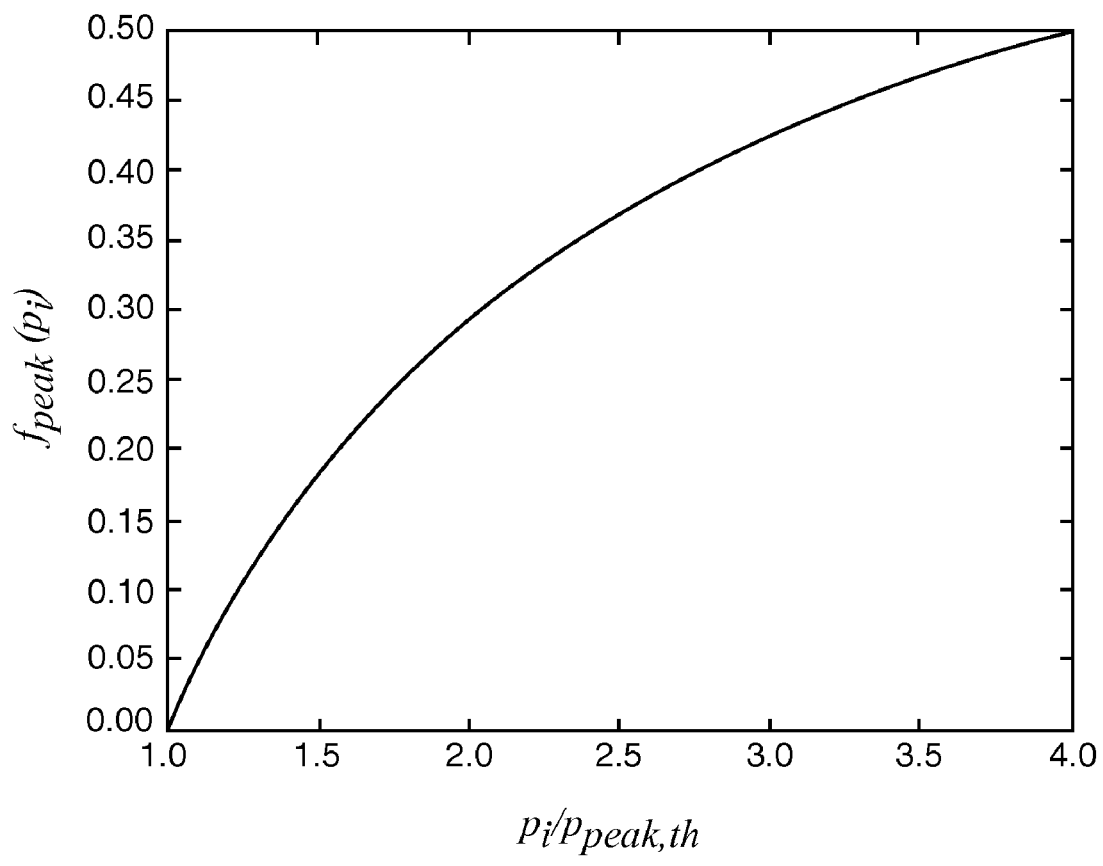
FIG. 14 is a graph of an "overshoot" function used in one or more embodiments of PAR reduction as taught herein.

Use of the $f_{peak}(\cdot)$ function in this embodiment offers further operational and implementation advantages. More particularly, the $f_{peak}(\cdot)$ function is defined in such a way that it relates to, or otherwise expresses, the overshoot of the detected peak relative to the peak detection threshold, and allows computation of $s_{peak}$ simply by separately multiplying the I and Q components of the complex-valued input signal by the non-linear function for $P_2$. Furthermore, as illustrated in FIG. 14, the $f_{peak}(\cdot)$ function is well behaved, meaning that it is nicely implemented using a relatively low-order polynomial expression for on-the-fly determination, or easily implemented in look-up-table form using a relatively small number of representative values. In at least one look-up table embodiment, $f_{peak}(\cdot)$ determination may include interpolating between look-up table values.

In more detail, in at least one embodiment the $f_{peak}(\cdot)$ function is defined as $$f_{peak}(p_i) = 1 - \sqrt{\frac{p_{peak,th}}{p_i}} \quad \text{Eq. (11)}$$

where $p_{peak,th} < p_i \leq p_{max}$. Here, $p_{max}$ indicates the maximum squared amplitude of the input signal, $r_{max}^2$. Correspondingly we have $p_i = r_i^2$ and $p_{peak,th} = r_{peak,th}^2$. The total PAR reduction (TPARR) thus may be defined by $$TPARR = p_{max}/p_{peak,th} \quad \text{Eq. (12)}$$

Note that TPARR is typically less (or much less) than 4 on a linear power scale, or 6 dB.

With the above functional definition, one may express the $f_{peak}(\cdot)$ function in terms of the defined peak thresholds and the Cartesian components of the detected signal peak as, $$f_{peak} = 1 - \sqrt{\frac{r_{peak,th}^2}{I_i^2 + Q_i^2}} \quad \text{Eq. (13)}$$

$$= 1 - \sqrt{\frac{r_{peak,th}^2}{r_i^2}}$$

$$= 1 - \frac{r_{peak,th}}{r_i}$$

$$= \frac{r_i - r_{peak,th}}{r_i}$$

where $r_i - r_{peak,th}$ is the overshoot, i.e., the magnitude of the signal that is above the defined peak threshold. In turn, that fact means that the $f_{peak}(\cdot)$ function may be expressed as $$f_{peak} = \frac{r_i - r_{peak,th}}{r_i} \quad \text{Eq. (14)}$$

Thus, when implemented as $$f_{peak} = 1 - \sqrt{\frac{r_{peak,th}^2}{I_i^2 + Q_i^2}} \quad \text{Eq. (15)}$$

the $f_{peak}(\cdot)$ function still reflects a computationally optimal solution, as it is a function of the $I_i^2 + Q_i^2$ values already determined in the peak detection process.

Assuming the detection of a signal peak in excess of the peak threshold provided one embodiment of the corresponding peak waveform calculation on which peak characterization is based. In more detail, peaks were previously defined as, $$s_{peak} = r_{peak} \cdot e^{i\phi_i} \quad \text{Eq. (16)}$$

If one assumes that this equation is evaluated only if a signal peak in excess of the threshold is detected, one may express the peak waveform equation as, $$s_{peak} = (r_i - r_{peak,th}) \cdot e^{i\phi_i} \quad \text{Eq. (17)}$$

Further, to obtain expressions for the detected peak in Cartesian components, one may express the peak waveform equation as, $$s_{peak} = \left(\sqrt{I_i^2 + Q_i^2} - r_{peak,th}\right) \cdot \frac{I_i + jQ_i}{\sqrt{I_i^2 + Q_i^2}} \quad \text{Eq. (18)}$$

$$= (I_i + jQ_i) \cdot \left(1 - \sqrt{\frac{r_{peak,th}^2}{I_i^2 + Q_i^2}}\right)$$

Thus, the peak can be calculated as the product of the complex-valued signal in Cartesian form and a non-linear function based on the peak threshold. Further simplifications relative to Eq. (18) are possible, given that the expression will be evaluated only where the signal exceeds the peak threshold, i.e., only where $I_i^2 + Q_i^2 > r_{peak,th}^2$. Additionally, it will be appreciated that the peak waveform thus computed is used to find a cancellation pulse that is a good approximation for the ideal cancellation pulse, rather than trying to find or otherwise generate a cancellation pulse that is an exact match. Practically, cancellation pulses will not exactly fit the peaks to be cancelled, and thus peak cancellation is not, in practice a complete cancellation with zero error or artifacts. However, the PAR reduction method taught herein provides benefits to the extent that the signal's PAR is reduced while maintaining acceptable spectral properties in the resultant PAR-reduced signal.

Indeed, as taught herein, the peak waveform calculations and/or the cancellation pulse fitting operations may be performed using a constrained or limited accuracy, and over-cancellation may be used to make up for the lowered precision. With over-cancellation, the cancellation pulse width and/or height (or other scalable property) is made greater than the corresponding property in the calculated peak waveform, such that the cancellation pulse over-cancels the corresponding signal peak. Over-cancellation in this regard allows lower precision in the peak waveform characterization process at the expense of slightly increased EVM.

Regarding details of the peak characterization process, it may be noted that the most basic properties of a peak may be defined by its magnitude, i.e. the maximum amplitude of the peak disregarding the actual position of that maximum value within the peak, and the width/duration of the peak. Further parameters may be found for the detected peak, such as the position of the maximum value for each peak and other shape characteristics. In at least one embodiment, detecting peaks in the signal that are above a peak threshold comprises detecting peaks in polar form. In the same or other embodiments, characterizing the detected peaks in Cartesian coordinates comprises characterizing peak shapes for the Cartesian components of each detected peak. In such operations, characterizing peak shapes for the Cartesian components of each detected peak comprises, in at least one embodiment, characterizing at least one of peak width, peak amplitude, and peak asymmetry.

Figure 15:
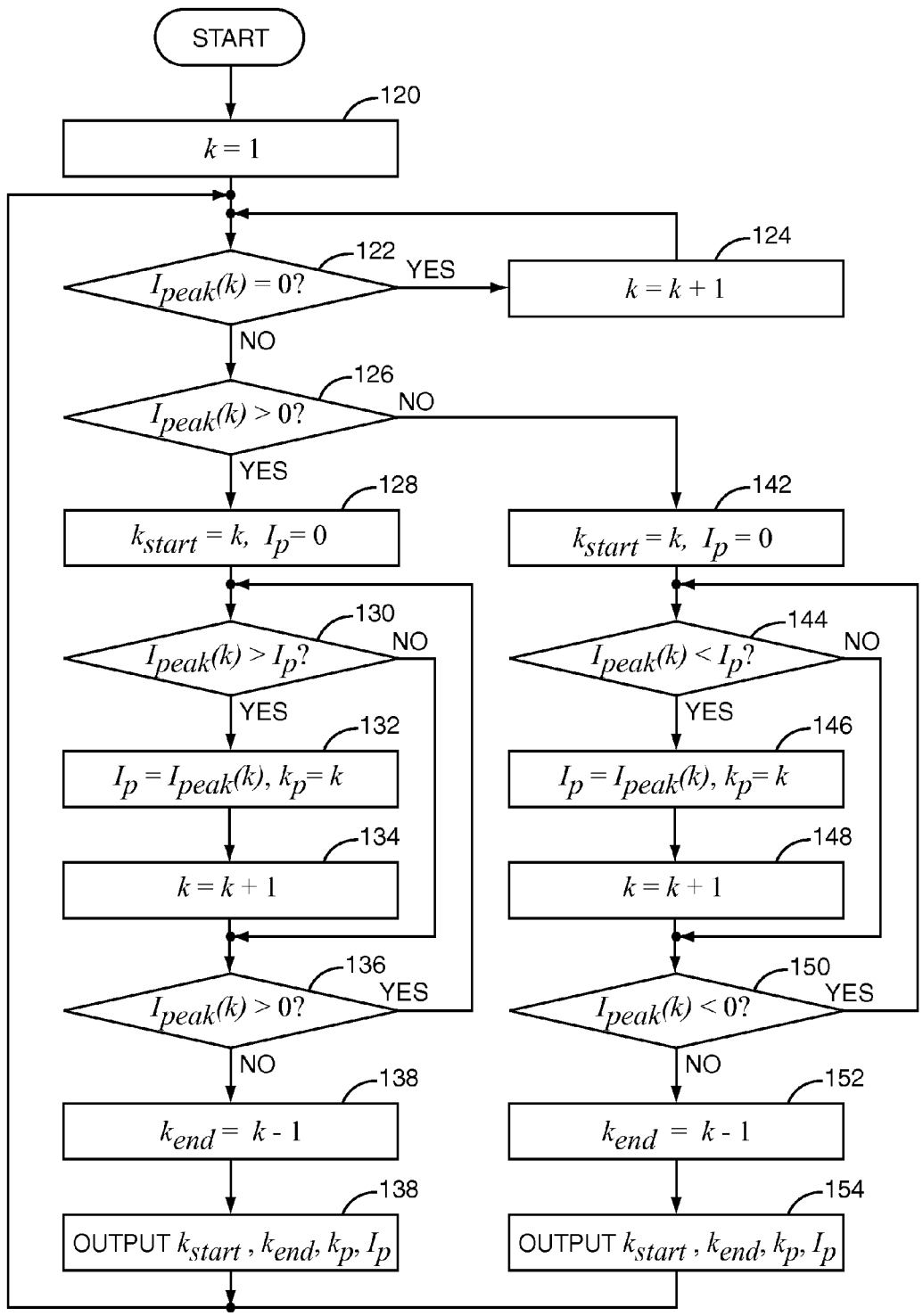
FIG. 15 is a logic flow diagram of one embodiment of characterizing a detected signal peak for cancellation purposes, wherein the illustration relates to characterization of the I-path detected peak component and like processing is used for the Q-path detected peak component.

As a more detailed example, FIG. 15 is a flow diagram illustrating one embodiment of peak characterization for a detected signal peak. Specifically, FIG. 15 illustrates the characterization of the I component of a detected peak—a like characterization process may be performed concurrently or subsequently for the Q component of the detected peak—and thus illustrates the characterization of detected peaks in Cartesian coordinates.

The illustrated process, Steps 120-154, traverses a sequence of samples of the signal (or corresponding samples of peak waveform), where the sample index k indexes respective ones of the signal samples. Overall, the illustrated processing finds the beginning, end, and maximum value position of a detected peak (in terms of the corresponding sample indexes), and further identifies the maximum value of the detected peak, including the sign/direction. That is, by stepping through the indexed sampled values of the peak waveform (see, e.g., FIG. 6 for an illustration of an I-path peak waveform), the peak characterization process of FIG. 15 outputs $k_{start}$ corresponding to the index value where a detected peak starts, $k_{end}$ corresponding to the index value where the detected peak ends, and $k_p$ corresponding to the index value between $k_{start}$ and $k_{end}$ that coincides with the actual peak point of the detected peak. The process further outputs the value of the actual peak point, $I_p$.

Once a detected peak is characterized in Cartesian coordinates by the signal processing circuit 14, it continues PAR reduction processing with generation of the appropriate cancellation pulses. In at least one embodiment, generating cancellation pulses in Cartesian coordinates based on the detected peak characterizations comprises, for each detected peak, scaling a normalized pulse for each Cartesian component of the detected peak based on the corresponding characterized peak shape. More generally, in one or more embodiments, generating cancellation pulses in Cartesian coordinates based on the detected peak characterizations comprises, for each detected peak, selecting a closest-matching normalized pulse from a defined set of normalized pulses for the I signal peak and for the Q signal peak.

In the same or other embodiments, characterizing the detected peaks in Cartesian coordinates comprises characterizing I and Q signal peak shapes for each detected peak, such that generating cancellation pulses in Cartesian coordinates based on the detected peak characterizations comprises selecting closest matching normalized pulses from a defined set of normalized pulses based on the characterized I and Q signal peak shapes. The method may further include defining the normalized pulses in the defined set of normalized pulses based on at least one of a peak shape and a peak asymmetry.

In any case, characterizing the detected peaks in Cartesian coordinates generally comprises characterizing peak shapes for the I and Q components of each detected peak, such that cancellation pulse generation for each detected peak comprises generating I-component and Q-component cancellation pulses. Thus, as described here, each "cancellation pulse" comprises an I-path cancellation pulse for the I-path component of the detected signal peak, and a Q-path cancellation pulse for the Q-path component of the detected signal peak. The I/Q cancellation pulse components thus cancel the corresponding detected signal peak in Cartesian coordinates.

Of course, as discussed previously, a cancellation pulse generally will not fit an arbitrary peak and thus using only the characterized width and magnitude of a detected peak may result in less than desired PAR reduction. To that end, the signal processing circuit 14 may be configured to improve its cancellation pulse generation processing in one or more ways. For example, it may be configured to enlarge a normalized cancellation pulse width by multiplying it with a factor $W_{scale}$, thus over-canceling a given detected peak in terms of width. Additionally, or alternatively, the signal processing circuit 14 may be configured to enlarge a normalized cancellation pulse peak maximum value by multiplying it with a factor $M_{scale}$, thus over-canceling a given detected peak in terms of amplitude. Further, additionally, or alternately, the signal processing circuit 14 may be configured to calculate time derivatives at the beginning and the end of the detected peak, and set the magnitude of the corresponding cancellation pulse to match these derivatives, rather than attempting to match the peak magnitude.

The width and/or magnitude rescaling options outlined immediately above are straightforwardly implemented in the signal processing circuit 14. However, the time derivative-based operation entails additional complexity. For example, referring back to the example signal peak illustrated in FIG. 9, and the corresponding normalized cancellation pulse depicted in FIG. 8, one may observe that the detected signal peak is not symmetric and, therefore, the width and maximum value of the detected peak are not, by themselves, sufficient to accurately characterize the detected peak for cancellation pulse generation.

With that point in mind, the time derivative based pulse characterization begins with the assumption of a normalized cancellation pulse that has been scaled in width and magnitude according to the detected peak. However, if any of the absolute time-derivatives (slopes) at the beginning or at the end of the peak is larger than that of the cancellation pulse, the signal processing circuit 14 scales the amplitude of cancellation pulse such that the time derivatives are made equal to that of the detected peak. In other words, the signal processing circuit 14 performs the derivative-based amplitude adjustment rather than simply scaling the cancellation pulse amplitude with respect to the maximum amplitude of the detected peak.

Figure 16:
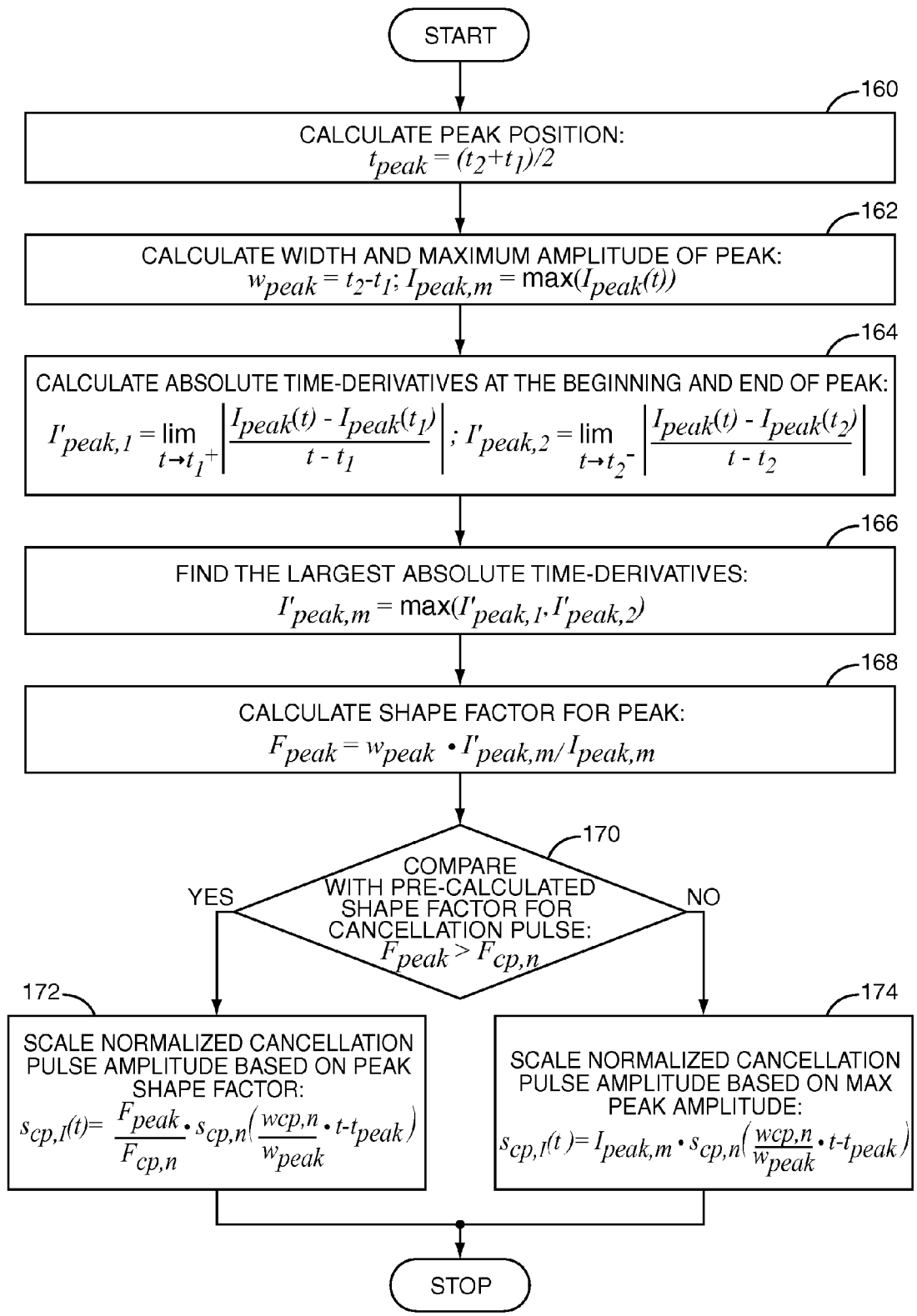
FIG. 16 is a logic flow diagram of one embodiment of characterizing a detected peak in terms of a shape factor, and corresponding use of that shape factor in adjusting a normalized cancellation pulse for cancellation of the detected peak.

Steps 160-174 (even) of FIG. 16 illustrate one embodiment of the derivative-based pulse generation method, and its processing applies to the calculation of one cancellation pulse for one positive peak in the I-path of the signal. Of course, such processing would more generally be applied to every peak within the peak waveform, for both the I-path and Q-path Cartesian components. Note, too, that the illustrated processing introduces the concept of a "shape factor." The value $f_{cp,n}$ in the illustration denotes the shape factor of a normalized cancellation pulse, which may be pre-calculated for generation of a given cancellation pulse. Further, $w_{cp}$ denotes the width (in time) of a normalized cancellation pulse, which also may be pre-calculated.

For a detected peak, processing involves calculating the peak position in the signal as $$t_{peak} = \frac{t_2 + t_1}{2} \qquad \text{Eq. (19)}$$

(Step 160), the width and maximum amplitude of the peak as $$w_{peak} = t_2 - t_1, \quad I_{peak,m} = \max(I_{peak}(t)) \qquad \text{Eq. (20)}$$

(Step 162), and absolute time derivatives at the beginning and end of the peak $$I'_{peak,1} = \lim_{t \to t_1^+} \left| \frac{I_{peak}(t) - I_{peak}(t_1)}{t - t_1} \right|, \qquad \text{Eq. (21)}$$

$$I'_{peak,2} = \lim_{t \to t_2^-} \left| \frac{I_{peak}(t) - I_{peak}(t_2)}{t - t_2} \right|$$

(Step 164).

Processing continues with identifying the largest one of the calculated derivatives as $$I'_{peak,m} = \max(I'_{peak,1}, I'_{peak,2}) \qquad \text{Eq. (22)}$$

(Step 166), and then using that value to compute the shape factor $F_{peak}$ for the peak $$F_{peak} = w_{peak} \cdot \frac{I'_{peak,m}}{I_{peak,m}} \quad \text{Eq. (23)}$$

(Step 168). Comparison of the calculated shape factor for the detected peak with a pre-calculated shape factor for the normalized cancellation pulse (Step 170) determines the scaling applied to the normalized cancellation pulse amplitude. That is, if $F_{peak} > F_{cp,n}$, then the normalized cancellation pulse amplitude is scaled based on the peak shape factor, which is calculated as $$s_{cp,l}(t) = \frac{F_{peak}}{F_{cp,n}} \cdot s_{cp,n}\left(\frac{w_{cp,n}}{w_{peak}} \cdot t - t_{peak}\right) \quad \text{Eq. (24)}$$

(Step 172). On the other hand, if $F_{peak}$ is not greater than $F_{cp,n}$, the normalized cancellation pulse amplitude is scaled based on the maximum peak amplitude, which is calculated as $$s_{cp,l}(t) = I_{peak,m} \cdot s_{cp,n}\left(\frac{w_{cp,n}}{w_{peak}} \cdot t - t_{peak}\right) \quad \text{Eq. (25)}$$

(Step 174).

In understanding the above processing, one may understand the shape factor as describing the "sharpness" of a detected peak, and it may be defined as the absolute maximum time derivative normalized to the width of the detected peak and the maximum amplitude value of the detected peak. In operation, if the shape factor for a detected peak is larger than the shape factor of the best-matching cancellation pulse, the cancellation pulse amplitude is scaled accordingly with respect to the shape factor. Likewise, if the shape factor for the detected peak is less than the shape factor of the selected cancellation pulse, the cancellation pulse amplitude is scaled accordingly with respect to the detected peak amplitude.

Figure 17:
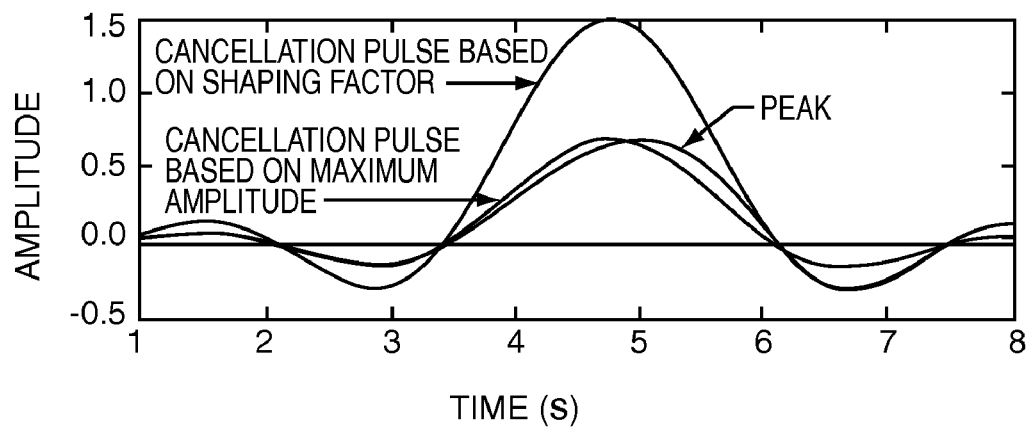
FIG. 17 is a waveform diagram illustrating one embodiment of shape factor adjustment for cancellation pulses.

FIG. 17 illustrates the case where the amplitude of a cancellation pulse is scaled upward as a function of shape factor, and illustrates the difference such scaling makes with respect to a cancellation pulse based simply on the maximum magnitude of the detected peak.

With use of the shape factor, the signal processing circuit 14 (and the corresponding PAR reduction method) can ensure more or less complete cancellation of detected peaks as long as the slopes of the detected peaks are the highest at the peak beginnings or ends. The penalty is over-compensation (over-cancellation), as the difference between the detected peak and the corresponding cancellation pulse adjusted for shape factor can become significant in general and, as a consequence, such differences increase the EVM of the PAR reduced signal.

To that end, at least one embodiment of the PAR reduction method as taught herein uses shape factor scaling of the cancellation pulses but reduces the impact of shape factor scaling on signal EVM by defining more than one normalized cancellation pulse. For example, besides the need to define cancellation pulses of different widths, the signal processing circuit 14 may store a defined set of cancellation pulses comprising a set of normalized cancellation pulses with different shape factors. In such a case, the signal processing circuit 14 would select the cancellation pulse that best fits the detected peak with respect to the shape factor. Additionally, or alternatively, the signal processing circuit 14 may maintain a defined set of normalized cancellation pulses with different degrees of asymmetry, and thus use the cancellation pulse that best fits a detected peak with respect to the asymmetry.

Additionally, or alternatively, the signal processing circuit 14 may maintain a defined "two-dimensional" set of normalized cancellation pulses having different degrees of asymmetry and different shape factors. Thus, to cancel a given detected pulse, the signal processing circuit 14 selects the normalized cancellation pulse from the defined set that is closest matching in terms of shape factor and asymmetry. (Asymmetry matching may be given greater weight over shape factor or vice versa, in dependence on the signal type/modulation scheme involved, or based on empirical testing.) In any case, the asymmetry can be quantified by the location of the maximum amplitude of the detected peak. The difference between the maximum amplitude location and the midpoint $((t_2-t_1)/2)$ of the detected peak is a measure of the asymmetry, and thus may be used to determine the optimal cancellation pulse from a defined set of cancellation pulses stored in a memory accessible to the signal processing circuit 14 (or otherwise embodied in a generator function, look-up table, or other mechanism for representing signal waveforms).

Figure 18:
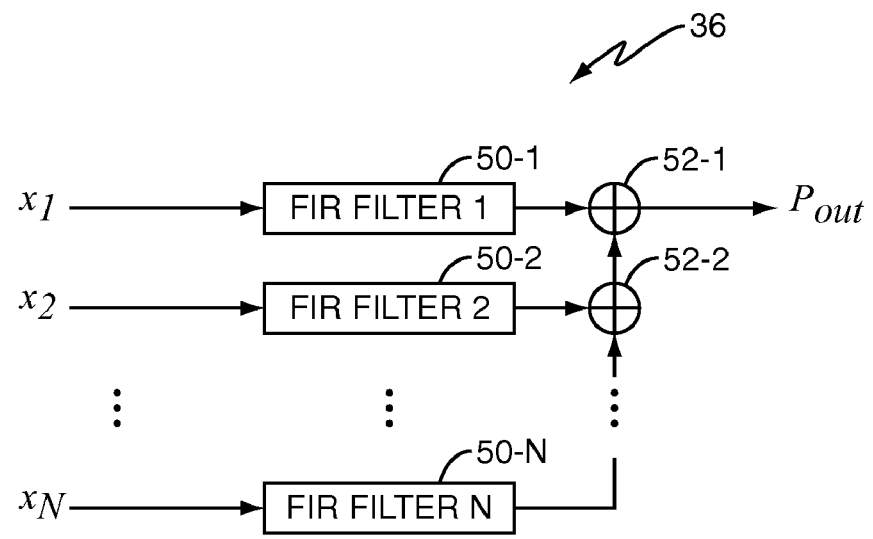
FIG. 18 illustrates one embodiment of the cancellation pulse generation circuitry introduced in FIG. 3.
Figure 19:
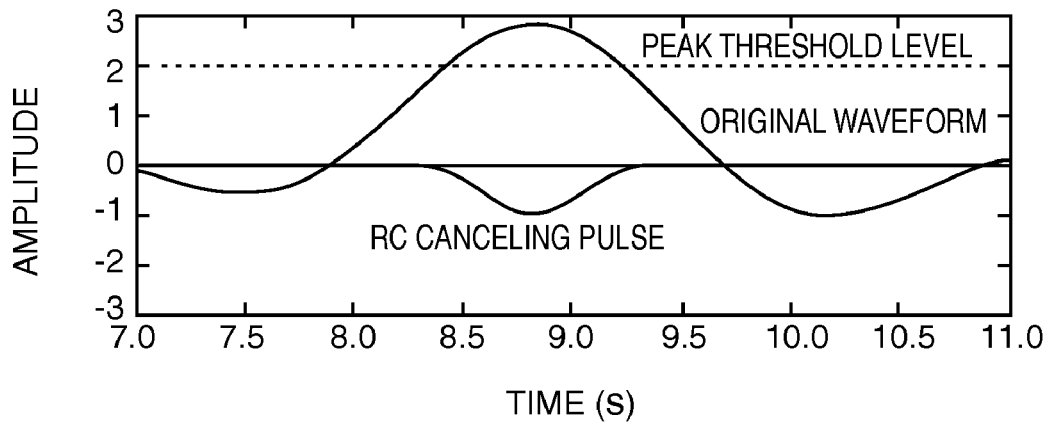
Figure 20:
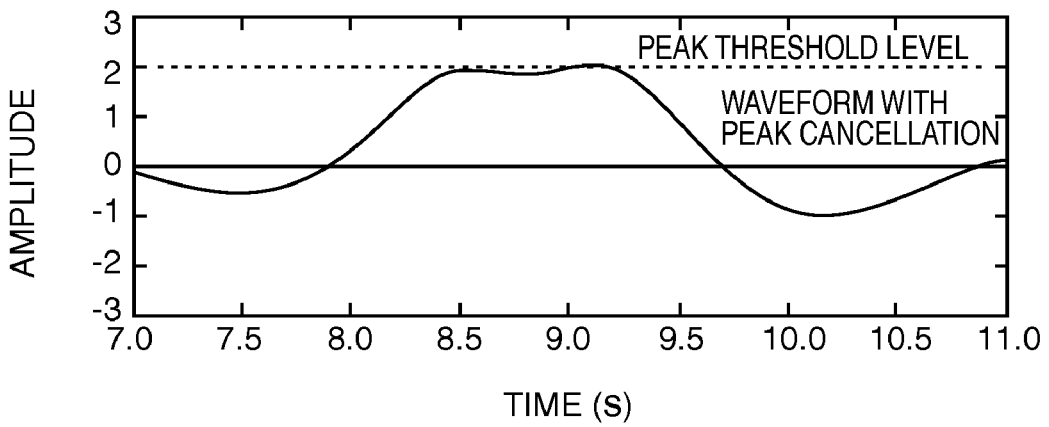
FIG. 20 illustrates the corresponding reduced-peak waveform.

As for pulse generation techniques, FIG. 18 illustrates one implementation of the pulse generator circuits 36 first introduced in FIG. 3, wherein each pulse generator 36 comprises a bank of finite impulse response (FIR) filters 50-1-50-N. In cancellation pulse generation operation, the magnitudes and signs of the cancellation pulses are controlled by feeding the FIR filters 50-1-50-N with a sample pulse having the desired magnitude and sign. For reference, FIG. 19 illustrates a signal peak to be cancelled and a corresponding RC-based sample pulse, while FIG. 20 illustrates the resultant signal waveform after combining the cancellation pulse with the signal in proper time alignment.

Of course, there are many ways to implement the pulse generator circuits 36, but FIG. 18 illustrates an approach that is convenient and scalable, where the set of FIR filters 50 and the coefficients of each FIR filter represents a cancellation pulse with a certain width, and possibly other shape characteristics as well. With this implementation approach, the desired cancellation pulse output is obtained by feeding the bank of FIR filters 50 with a single sample pulse having the desired magnitude and sign. The set of FIR filters 50 operate in parallel, which allows several cancellation pulses with different properties to be generated at the same time. One advantage to such operation is that a cancellation pulse typically has a duration longer than the detected peak to be cancelled as a result of the spectral requirements on the cancellation pulses. Thus, cancellation pulses may overlap.

Notably, a large set of FIR filters 50 provides gains in accuracy, as a larger filter set enables more accurate peak characteristic matching, but comes at the expense of circuitry complexity. One may avoid multiplications of the FIR filters 50 altogether if the set of filters includes one filter per width, amplitude and shape characteristic. That is, if, for each width, shape, and amplitude, there exists one FIR filter that allows only three input levels −1,+1, or 0 (zero), then one avoids complicating multiplications, while still ensuring good peak cancellation by selecting the next largest width and amplitude relative to the detected peak.

As a further improvement, as only one sample per detected peak to be cancelled goes into a respective one of the FIR filters 50, most samples will be zero. For that reason, the pulse generation circuits 36 may include additional circuitry for controlling the FIR filters 50 to avoid unnecessary computations (i.e. multiplication with zero).

Figure 21:
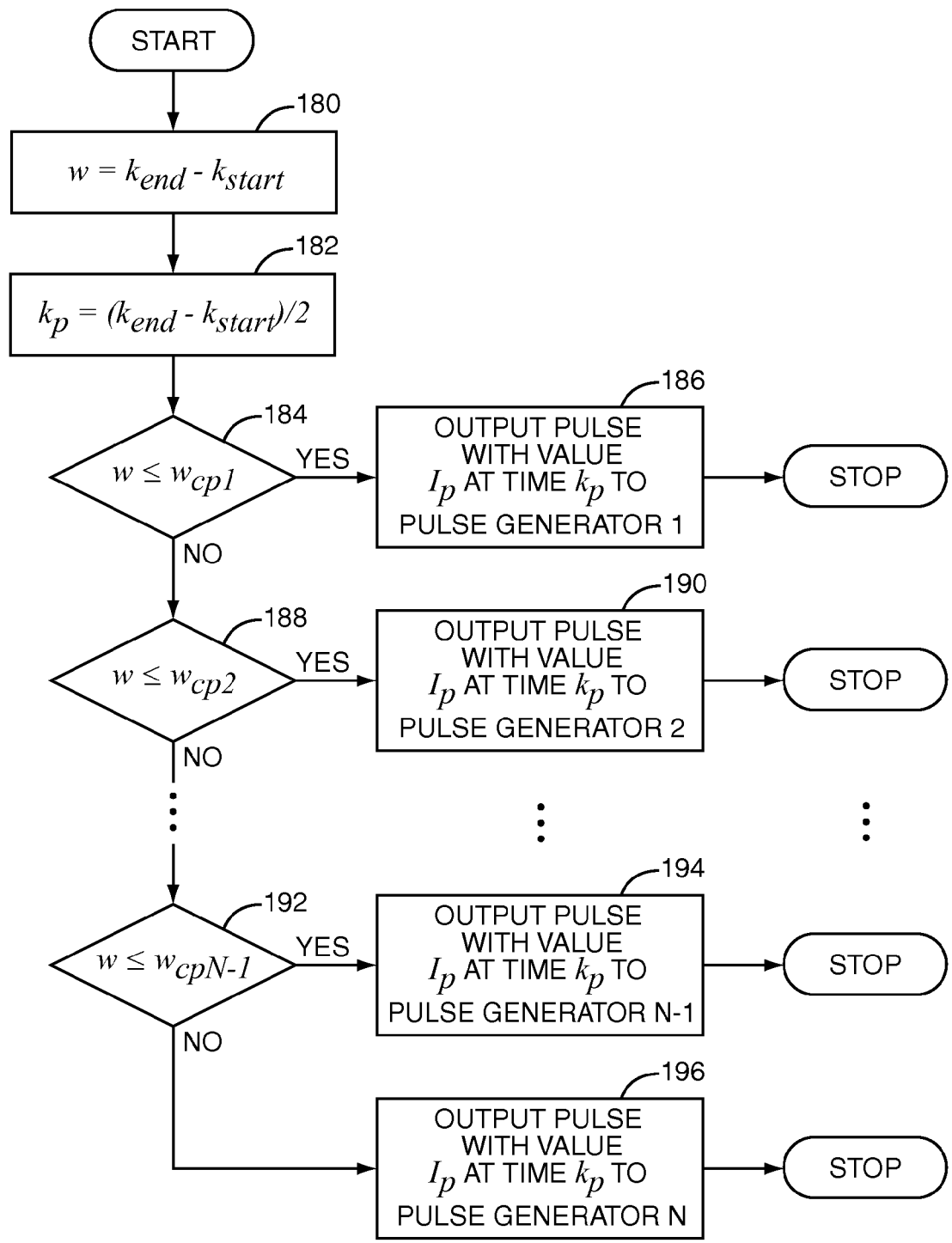
FIG. 21 is a logic flow diagram of one embodiment of outputting appropriately time-aligned cancellation pulses using the generation circuitry of FIG. 18, for example.

Regardless of such details, Steps 180-196 (even) of FIG. 21 illustrate one embodiment of cancellation pulse selection logic that may be implemented in the signal processing circuit 14, wherein the width (w=$k_{start}$–$k_{end}$) and the maximum value position ($k_p$=($k_{end}$+$k_{start}$)/2), which is assumed to be at the midpoint of the beginning and end of the peak, are determined (Steps 180, 182). The peak width is then compared with the cancellation pulse widths available in the defined set of cancellation pulses, to find the next larger cancellation pulse width available (Steps 184, 188, and 192 represent comparisons, while Steps 186, 190, 194, and 196 represent corresponding single sample pulse generation for triggering a cancellation pulse). The cancellation pulse is then triggered by feeding a single sample pulse with a value equal to the detected peak max value, $I_p$ (or $Q_p$ in the like context of Q path processing). The single sample pulse should be aligned in time with the detected peak to be cancelled. Each of the FIR filters 50-1 through 50-N in the bank of filters 50 may be regarded as one of N pulse generators capable of generating a cancellation pulse of differing characteristics in response to the single sample pulse.

Figure 22:
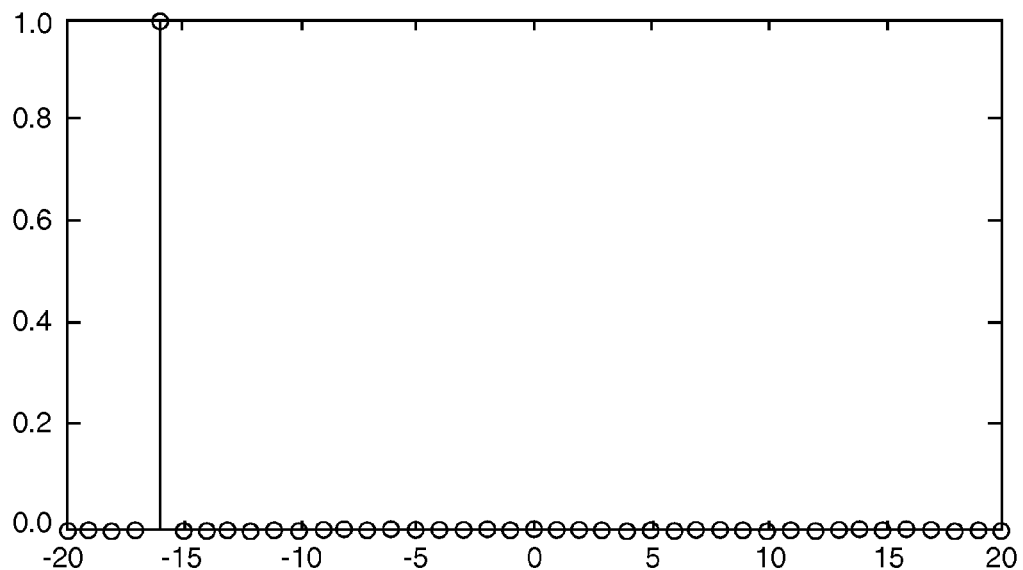
FIGS. 22 and 23 are waveform diagrams respectively illustrating an input pulse for FIR-based cancellation pulse generation and the corresponding output cancellation pulse.
Figure 23:
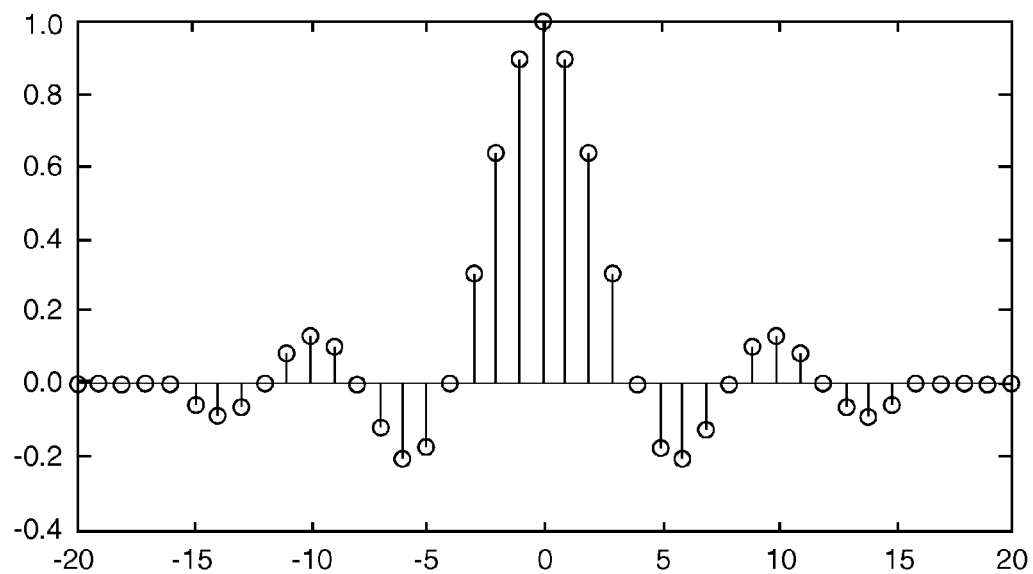

A single sample pulse thus may be generated for each peak to be canceled and fed to a corresponding one of the FIR filters 50, such that the FIR filter output is the impulse response of the FIR filter itself, but having a magnitude scaled by the input pulse magnitude. The input pulse magnitude is set as a function of the detected pulse amplitude, such that the cancellation pulse properly cancels the detected pulse. In other words, for each detected pulse to be cancelled, a single pulse instance in time is fed to one of the FIR filters 50. At all other time instances, the FIR filter(s) 50 are fed with zeros, for example. By way of non-limiting illustration, FIG. 22 illustrates an input pulse for a given one of the FIR filters 50, shown with preceding and succeeding zero values. FIG. 23 illustrates the corresponding cancellation pulse output from that particular one of the FIR filters 50. Of course, the FIR filter output scales with the magnitude of the input pulse to the filter.

Thus, in at least one embodiment, the detected peak characterizations comprise I-component and Q-component peak characterizations corresponding to I and Q components of the detected peak, and generating cancellation pulses in Cartesian coordinates based on the detected peak characterizations comprises generating a sample pulse for each of the I and Q components of the detected peak based on the corresponding I-component and Q-component peak characterizations. The sample pulses are directed to corresponding ones of the FIR filters 50, such that output pulses from the corresponding FIR filters serve as I and Q cancellation pulses for the I and Q components of the detected peak.

Of course, effective peak reduction requires the generated cancellation pulses to be properly aligned in time with the signal. Therefore the implementation of the cancellation pulse selector is very much dependent on the implementation of the pulse generator set. While many different approaches can be designed by those skilled in the art of signal processing and digital design, the example given here relies on a pulse selector function or circuit that maps peak property data, i.e., pulse characterization data, to a pulse generator consisting of a set of FIR-filters with different pulse widths.

In assessing how peak reduction is—i.e., the performance of PAR reduction as taught herein—one may evaluate example performance in given system contexts. For example, one may assume an OFDM signal having a PAR of 8.4 dB. Further, Assume that PAR reduction is intended to reduce the PAR of this signal to 6.0 dB, i.e., $r_{peak,th}$/RMS=2, and that peak cancellation pulses are regular RC pulses with roll-off factor α=1.0; cancellation pulse width and magnitude are set exactly to the width and magnitude of the detected peaks to be cancelled; and a lower limit for the normalized cancellation pulse width is set to 2 seconds to limit spectral expansion.

Figure 24:
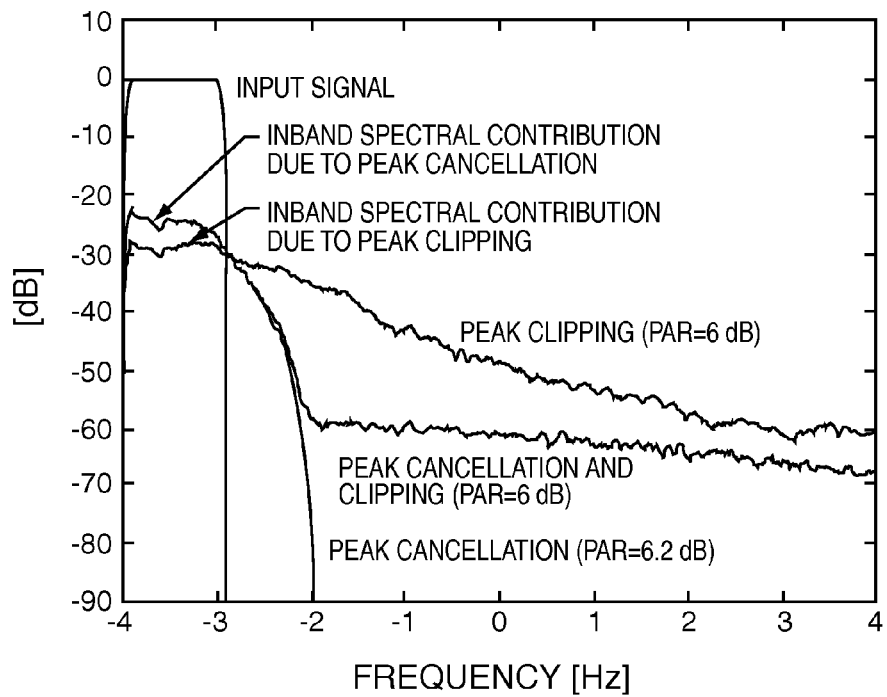
FIG. 24 is a waveform diagram illustrating PAR reduction performance in one embodiment.

FIG. 24 illustrates PAR reduction results for the above scenario in comparison to a brute-force peak clipping approach. One sees a large reduction of spectral expansion outside the signal bandwidth when compared with brute-force peak clipping, while signal PAR is aggressively reduced from 8.4 dB to 6.2 dB. Thus, a one-pass PAR reduction provided significant improvements, while not quite reaching the 6.0 dB target.

One approach to reaching that target involves iterative PAR reduction, wherein the PAR-reduced signal is again processed for peak detection, possibly using a lower or otherwise adjusted second peak detection threshold. In this manner, remaining peaks not sufficiently reduced in the first pass of PAR reduction may be detected, characterized, and cancelled in the second pass. Of course, more than two passes may be used in at least some applications. In general, at least one embodiment of the PAR reduction method taught herein performs peak detection on the signal of interest to obtain a PAR-reduced signal, and then further comprises detecting remaining peaks in the PAR-reduced signal—i.e., in the delayed version of the original signal after canceling the detected peaks—and characterizing and canceling the detected remaining peaks.

As another performance example, one may consider an HSUPA (High Speed Uplink Packet Access) signal (from the 3GPP standard). Such signals are known to have large PARs. The PAR reduction method taught herein thus offers an advantageous way of reducing HSUPA signal PAR, while still meeting ACLR (adjacent-channel leakage power ratio) and EVM requirements. In this context, the signal processing circuit 14 is configured to use a regular RC cancellation pulse with roll-off factor α=0.5. Further, the cancellation pulse widths and magnitudes are set to the widths and magnitudes of the detected peaks to be cancelled. Further, a lower limit for the width is set to the 0.75 times the HSUPA signal chip period of 260 ns, to limit spectral expansion at the expense of somewhat increased EVM.

Figure 25:
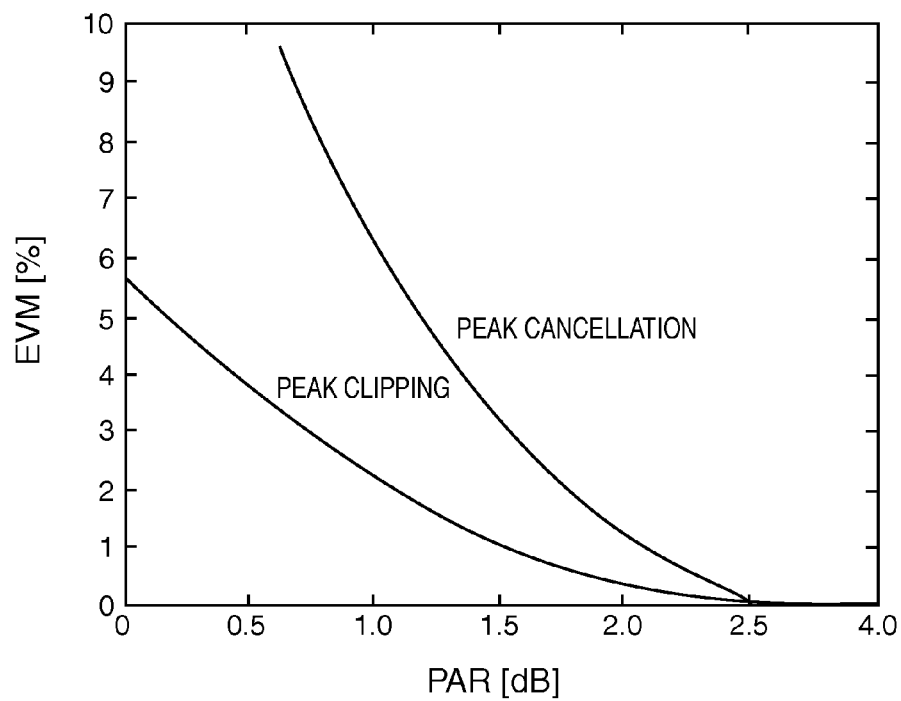
FIGS. 25 and 26 are waveform diagrams illustrating PAR reduction performance in another embodiment.
Figure 26:
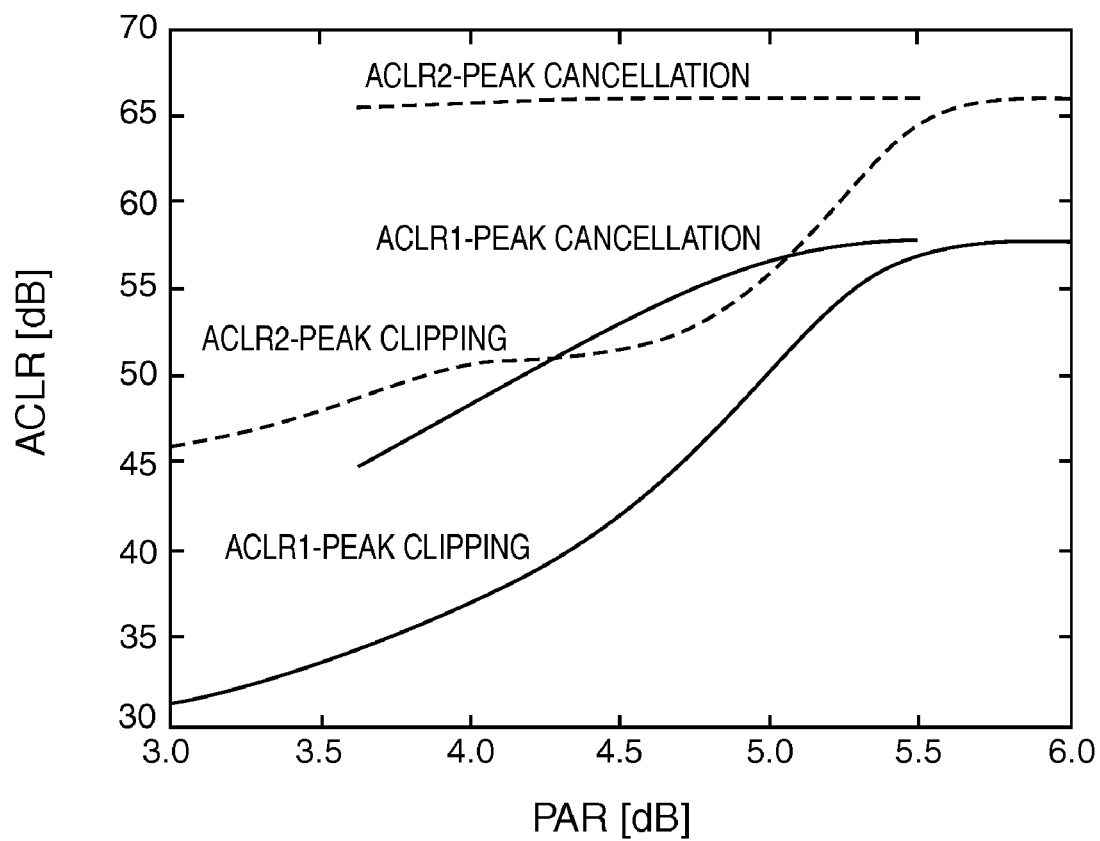

FIGS. 25 and 26 respectively illustrate EVM and ACLR as a function of PAR reduction as taught herein, with peak-clipping based PAR reduction shown for comparative performance reference. Both EVM and ACLR are shown as functions of actual PAR, that is, the PAR measured for the HSUPA signal after peak cancellation and peak clipping. In this particular configuration, the ACLR1 is more than 10 dB better for peak cancellation using the method taught herein than for brute-force peak clipping. These benefits inure over a large range of PAR.

On the other hand, one sees that EVM is larger with peak cancellation as compared to brute-force peak clipping. However, by decreasing the minimum width of cancellation pulses, the EVM would become lower at the expense of increased ACLR. The optimal combination of EVM, ACLR, and PAR will be selected as needed or desired, in consideration of radio link budget calculations applicable for the communication standards of interest.

With all of the above in mind, those skilled in the art will appreciate that PAR reduction as taught herein may be adjusted or modified for the particular application at hand. The above discussion offered selected examples of such modifications, such as the use of iterative peak cancellation, the use of over-cancelling in generation of the peak cancellation pulses, the use of different normalized pulses in a set of normalized pulses, the generation and use of asymmetric cancellation pulses, the adoption of shaping factor considerations in cancellation pulse generation, etc.

However, these and other examples are not limiting with respect to the present invention. Broadly, PAR reduction as taught herein detects signal peaks above a defined peak threshold, where such detection advantageously may be performed in polar form. PAR reduction further includes calculation of the peak waveforms corresponding to the detected peaks and correspondingly characterizing the detected peaks in Cartesian coordinates—i.e., characterization of the I and Q peak waveform components. The detected peak characterizations are then used to generate the corresponding cancellation pulses in Cartesian coordinates, which are then combined with an appropriately time-delayed version of the signal, such that the Cartesian components of the cancellation pulses align with the corresponding Cartesian components of the signal.

As such, the present invention is not limited by the foregoing descriptions and accompanying drawings. Instead, the present invention is limited only by the claims and their legal equivalents.

What is claimed is:

1. A method of reducing a peak-to-average ratio in a complex-valued signal comprising:
   detecting peaks in the signal that are above a peak threshold;
   characterizing a peak shape for each Cartesian component of the detected peaks;
   generating cancellation pulses corresponding to each of the Cartesian components of the detected peaks based on the characterized peak shapes; and
   canceling the detected peaks by combining the cancellation pulses with a correspondingly delayed version of the signal;
   wherein detecting peaks in the signal that are above a peak threshold comprises evaluating the signal at a first peak detection precision and, for peaks detected at the first peak detection precision, evaluating the signal at a greater second peak detection precision to confirm the presence of peaks detected at the first peak detection precision; and
   wherein the peak threshold is in polar form, and wherein evaluating the signal at the first peak detection precision comprises comparing a sum of unsigned Cartesian components of the signal to the peak threshold, and wherein evaluating the signal at the second peak detection precision comprises comparing a sum of squared Cartesian components of the signal to the squared peak threshold.

2. The method of claim 1, wherein characterizing a peak shape for each Cartesian component of the detected peaks includes calculating signal peak waveforms in Cartesian form as a product of the signal in Cartesian form and a non-linear function based on the peak threshold and a sum of squared Cartesian components of the signal.

3. The method of claim 2, wherein the second term is calculated using one of a polynomial representation, or a look-up table representation.

4. The method of claim 1, wherein detecting peaks in the signal that are above a peak threshold comprises detecting peaks in polar form.

5. The method of claim 1, wherein characterizing a peak shape for each Cartesian component of the detected peaks comprises characterizing at least one of peak width, peak amplitude, and peak asymmetry for each Cartesian component of the detected peaks.

6. The method of claim 1, wherein generating cancellation pulses corresponding to each of the Cartesian components of the detected peaks based on the characterized peak shapes comprises, for each detected peak, scaling a normalized pulse for each Cartesian component of the detected peak based on the corresponding characterized peak shape.

7. The method of claim 1, wherein characterizing a peak shape for each Cartesian component of the detected peaks comprises characterizing peak shapes for I and Q components of each detected peak, and wherein generating cancellation pulses corresponding to each of the Cartesian components of the detected peaks based on the characterized peak shapes comprises selecting closest matching normalized pulses from a defined set of normalized pulses based on the characterized peak shapes.

8. The method of claim 7, further comprising defining the normalized pulses in the defined set of normalized pulses based on at least one of a peak shape and a peak asymmetry.

9. The method of claim 1, further comprising detecting at least one remaining peak in the delayed version of the signal subsequent to canceling the detected peaks, using a second peak threshold, and characterizing and canceling the at least one detected remaining peak.

10. The method of claim 1, wherein generating cancellation pulses corresponding to each of the Cartesian components of the detected peaks based on the characterized peak shapes comprises generating the cancellation pulses based on one or more over-cancellation criteria.

11. The method of claim 1, wherein characterizing a peak shape for each Cartesian component of the detected peaks comprises calculating a shape factor for I and Q components of each detected peak, and wherein generating cancellation pulses corresponding to each of the Cartesian components of the detected peaks based on the characterized peak shapes comprises comparing the shape factors for the I and Q components of each detected peak to shape factors of corresponding normalized cancellation pulses and scaling the amplitudes of the corresponding normalized cancellation pulses based on the comparisons.

12. The method of claim 1, wherein characterizing a peak shape for each Cartesian component of the detected peaks comprises characterizing a peak shape for each I-component and Q-component of the detected peaks, and wherein generating cancellation pulses corresponding to each of the Cartesian components of the detected peaks based on the characterized peak shapes comprises generating a sample pulse for each of the I and Q components of the detected peaks based on the corresponding characterized I-component and Q-component peak shapes, directing the sample pulses to corresponding Finite Impulse Response (FIR) filters, such that output pulses from the corresponding FIR filters serve as I and Q cancellation pulses for the I and Q components of the detected peaks.

13. A signal processing circuit for reducing a peak-to-average ratio in a complex-valued signal comprising one or more processing circuits configured to:
   detect peaks in the signal that are above a peak threshold;
   characterize a peak shape for each Cartesian component of the detected peaks;
   generate cancellation pulses corresponding to each of the Cartesian components of the detected peaks based on the characterized peak shapes; and
   cancel the detected peaks by combining the cancellation pulses with a correspondingly delayed version of the signal;
   wherein the signal processing circuit is configured to detect peaks in the signal that are above a peak threshold by evaluating the signal at a first peak detection precision and, for peaks detected at the first peak detection calculation precision, evaluating the signal at a greater second peak detection precision to confirm the presence of peaks detected at the first peak detection precision; and wherein the peak threshold is in polar form, and wherein the signal processing circuit is configured to evaluate the signal at the first peak detection precision by comparing a sum of unsigned Cartesian components of the signal to the peak threshold, and to evaluate the signal at the second peak detection precision by comparing a sum of squared Cartesian components of the signal to the squared peak threshold.

14. The signal processing circuit of claim 13, wherein the signal processing circuit is configured to characterize a peak shape for each Cartesian component of the detected peaks by calculating signal peak waveforms in Cartesian form as a product of the signal in Cartesian form and a non-linear function based on the peak threshold and the sum of squared Cartesian components of the signal.

15. The signal processing circuit of claim 14, wherein the signal processing circuit is configured to calculate the second term using one of a polynomial representation, or a look-up table representation.

16. The signal processing circuit of claim 13, wherein the signal processing circuit is configured to characterize a peak shape for each Cartesian component of the detected peaks by characterizing at least one of peak width, peak amplitude, and peak asymmetry.

17. The signal processing circuit of claim 13, wherein the signal processing circuit is configured to generate cancellation pulses corresponding to each of the Cartesian components of the detected peaks based on the characterized peak shapes by, for each detected peak, scaling a normalized pulse for each Cartesian component of the detected peak based on the corresponding characterized peak shape.

18. The signal processing circuit of claim 13, wherein the signal processing circuit is configured to characterize a peak shape for each Cartesian component of the detected peaks by characterizing I-component and Q-component signal peak shapes for each detected peak, and wherein the signal processing circuit is configured to generate cancellation pulses corresponding to each of the Cartesian components of the detected peaks based on the characterized peak shapes by selecting closest matching normalized pulses from a defined set of normalized pulses based on the characterized I-component and Q-component signal peak shapes.

19. The signal processing circuit of claim 13, wherein the signal processing circuit is further configured to detect at least one remaining peak in the delayed version of the signal subsequent to canceling the detected peaks, using a second peak threshold, and to characterize and cancel the detected remaining peaks.

20. The signal processing circuit of claim 13, wherein the signal processing circuit is configured to characterize a peak shape for each Cartesian component of the detected peaks by calculating a shape factor for I and Q components of each detected peak, and wherein the signal processing circuit is further configured to generate cancellation pulses corresponding to each of the Cartesian components of the detected peaks based on the characterized peak shapes by comparing the shape factors for the I and Q components of each detected peak to shape factors of corresponding normalized cancellation pulses and scaling the amplitudes of the corresponding normalized cancellation pulses based on the comparisons.

21. The signal processing circuit of claim 13, wherein the signal processing circuit includes one or more Finite Impulse Response (FIR) filters, and wherein the signal processing circuit is configured to generate a sample pulse for each of an I component and a Q component of the detected peak based on corresponding I-component and Q-component peak characterizations for the detected peak, and to provide the sample pulses to corresponding ones of the FIR filters, such that output pulses from the corresponding FIR filters serve as I and Q cancellation pulses for the I and Q components of the detected peak.

* * * * *

UNITED STATES PATENT AND TRADEMARK OFFICE
CERTIFICATE OF CORRECTION

PATENT NO. : 7,995,975 B2
APPLICATION NO. : 11/614596
DATED : August 9, 2011
INVENTOR(S) : Sundstrom It is certified that error appears in the above-identified patent and that said Letters Patent is hereby corrected as shown below:

In Column 5, Line 29, delete "peak in in" and insert -- peak in --, therefor.

In Column 10, Line 47, delete "($s_{peak}$=0" and insert -- ($s_{peak}$=0) --, therefor.

In Column 12, Line 28, delete "$I_i^2 + Q_i^2 > r_{peak,th}^2 \cdot$" and insert -- $I_i^2 + Q_i^2 > r_{peak,th}^2 \cdot$ --, therefor.

In Column 14, Line 7, delete "resealing" and insert -- rescaling --, therefor.

In Column 14, Line 37, delete "$f_{cp,n}$" and insert -- $F_{cp,n}$ --, therefor.

In Column 19, Line 20, delete "descriptions" and insert -- description --, therefor.

Signed and Sealed this
Seventh Day of February, 2012

David J. Kappos
*Director of the United States Patent and Trademark Office*